(12) United States Patent
Tseng et al.

(10) Patent No.: US 12,457,576 B2
(45) Date of Patent: Oct. 28, 2025

(54) METHOD OF UPDATING LOCATION OF USER EQUIPMENT AND RELATED DEVICE

(71) Applicant: SHARP KABUSHIKI KAISHA, Sakai (JP)

(72) Inventors: Yung-Lan Tseng, Taipei (TW); Hsin-Hsi Tsai, Taipei (TW); Mei-Ju Shih, Taipei (TW); Hung-Chen Chen, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 325 days.

(21) Appl. No.: 18/028,022

(22) PCT Filed: Sep. 24, 2021

(86) PCT No.: PCT/CN2021/120316
§ 371 (c)(1),
(2) Date: Mar. 23, 2023

(87) PCT Pub. No.: WO2022/063227
PCT Pub. Date: Mar. 31, 2022

(65) Prior Publication Data
US 2024/0015689 A1    Jan. 11, 2024

Related U.S. Application Data

(60) Provisional application No. 63/083,696, filed on Sep. 25, 2020.

(51) Int. Cl.
*H04W 64/00* (2009.01)
*H04W 74/0833* (2024.01)
*H04W 76/27* (2018.01)

(52) U.S. Cl.
CPC ..... *H04W 64/003* (2013.01); *H04W 74/0833* (2013.01); *H04W 76/27* (2018.02)

(58) Field of Classification Search
CPC ........... H04W 64/003; H04W 74/0833; H04W 76/27; H04W 48/20; H04W 60/04; H04W 4/029
See application file for complete search history.

(56) References Cited

U.S. PATENT DOCUMENTS

2018/0092157 A1    3/2018   Chen
2018/0234890 A1*   8/2018   Shih .................. H04W 36/0005
(Continued)

FOREIGN PATENT DOCUMENTS

CN    107889274 A    4/2018
EP    4366378 A1     5/2024
(Continued)

OTHER PUBLICATIONS

Intel Corporation: "Control Plane leftover issues on SDT mechanism", 3GPP Draft; R2-2107293, 3GPP TSG RAN WG2 Meeting #115e, Electronic meeting, Aug. 16-27, 2021 (Aug. 6, 2021), paragraphs 2.2 to 3.
(Continued)

*Primary Examiner* — Farid Seyedvosoghi
(74) *Attorney, Agent, or Firm* — ScienBiziP, P.C.

(57) ABSTRACT

A method performed by a user equipment (UE) for updating a location of the UE in a radio resource control (RRC) inactive state is provided. The method includes determining whether a small data transmission (SDT) procedure is ongoing in a case that an event for triggering a location update procedure occurs; and initiating the location update procedure in a case that the SDT procedure is not ongoing.

20 Claims, 6 Drawing Sheets

(56) References Cited

U.S. PATENT DOCUMENTS

| | | |
|---|---|---|
| 2018/0270894 A1 | 9/2018 | Park et al. |
| 2021/0243691 A1* | 8/2021 | Ljung ............... H04W 52/0251 |
| 2021/0337602 A1 | 10/2021 | Liu et al. |
| 2022/0078697 A1* | 3/2022 | Tseng ................... H04W 72/21 |

FOREIGN PATENT DOCUMENTS

| | | |
|---|---|---|
| WO | 2020088097 A1 | 5/2020 |
| WO | 2022205360 A1 | 10/2022 |

OTHER PUBLICATIONS

VIVO, "Supporting Small Data Transmission via RA Procedure", R2-2006551, 3GPP TSG-RAN WG2 Meeting#111—electronic, E-Meeting, Aug. 17-28, 2020.

3GPP TS 38.214 V16.2.0 (Jun. 2020), 3rd Generation Partnership Project; Technical Specification Group Radio Access Network; NR; Physical layer procedures for data (Release 16).

3GPP TS 38.331 V16.1.0 (Jul. 2020), 3rd Generation Partnership Project; Technical Specification Group Radio Access Network; NR; Radio Resource Control (RRC) protocol specification (Release 16).

3GPP TS 38.401 V16.1.0 (Mar. 2020), 3rd Generation Partnership Project; Technical Specification Group Radio Access Network; NG-RAN; Architecture description (Release 16).

3GPP TS 23.501 V16.1.0 (Jun. 2019), 3rd Generation Partnership Project; Technical Specification Group Services and System Aspects; System Architecture for the 5G System; Stage 2 (Release 16).

* cited by examiner

METHOD OF UPDATING LOCATION OF USER EQUIPMENT AND RELATED DEVICE

CROSS-REFERENCE TO RELATED APPLICATION(S)

The present disclosure is a National Stage application, filed under 35 U.S.C. § 371, of International Patent Application Serial No. PCT/CN2021/120316, filed on Sep. 24, 2021, which claims the benefit of and priority to U.S. Provisional Patent Application Ser. No. 63/083,696, filed on Sep. 25, 2020, entitled "RADIO RESOURCE CONTROL MANAGEMENT FOR IDLE-MODE PACKET TRANSMISSION OF USER EQUIPMENT." The contents of all above-named applications are hereby fully incorporated herein by reference for all purposes.

FIELD

The present disclosure is generally related to wireless communications and, more specifically, to a method for updating a location of a user equipment (UE) in a radio resource control (RRC) inactive state and a related device.

BACKGROUND

With the tremendous growth in the number of connected devices and the rapid increase in user/network traffic volume, various efforts have been made to improve different aspects of wireless communication for the next-generation wireless communication system, such as the fifth-generation (5G) New Radio (NR) system, by improving data rate, latency, reliability, and mobility.

The 5G NR system is designed to provide flexibility and configurability for optimizing the network services and types and accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication for the next-generation wireless communication system.

SUMMARY

The present disclosure provides a method for updating a location of a user equipment (UE) in a radio resource control (RRC) inactive state and a related device.

According to an aspect of the present disclosure, a method performed by a UE for updating a location of the UE in an RRC inactive state is provided. The method includes determining whether a small data transmission (SDT) procedure is ongoing in a case that an event for triggering a location update procedure occurs; and initiating the location update procedure in a case that the SDT procedure is not ongoing.

In an implementation of the first aspect, the method further includes refraining from initiating the location update procedure in a case that the SDT procedure is ongoing.

In an implementation of the first aspect, the location update procedure includes a radio access network (RAN) notification area update (RNAU) procedure, and the event indicates that (i) an RNAU timer expires, or (ii) the UE moves out of a stored RAN notification area (RNA).

In an implementation of the first aspect, the method further includes starting the RNAU timer upon reception of a first value configured for the RNAU timer in a first radio resource control (RRC) release message that instructs the UE to move to the RRC inactive state; and keeping the RNAU timer running during the ongoing SDT procedure.

In an implementation of the first aspect, the method further includes receiving a second RRC release message as a response of the ongoing SDT procedure; re-starting the RNAU timer with a second value configured for the RNAU timer in a case that the second RRC release message includes the second value; and stopping the RNAU timer in a case that the second RRC release message does not include the second value.

In an implementation of the first aspect, the method further includes setting a parameter, that indicates whether the RNAU procedure is pending, to 'true' in a case that both of the following conditions are fulfilled: the RNAU timer has expired; and the UE receives an RRC reject message as a response of the ongoing SDT procedure.

In an implementation of the first aspect, the method further includes setting a parameter, that indicates whether the RNAU procedure is pending, to 'false' in a case that the UE initiates the SDT procedure.

In an implementation of the first aspect, the SDT procedure includes one of an RRC-based SDT procedure or an RRC-less SDT procedure, the RRC-based SDT procedure including transmitting a first packet that is embedded in an RRC resume request message, and the RRC-less SDT procedure including transmitting a second packet that is not embedded in the RRC resume request message.

In an implementation of the first aspect, the location update procedure includes a tracking area update (TAU) procedure in a case that the UE is configured to move to the RRC Inactive state or an RRC Idle state.

In an implementation of the first aspect, the SDT procedure includes one of a random access (RA) SDT procedure or a configured grant (CG) SDT procedure; and the SDT procedure is implemented on Evolved Universal Terrestrial Radio Access (E-UTRA) protocols or New Radio (NR) protocols.

According to another aspect of the present disclosure, a UE for updating a location of the UE in an RRC inactive state is provided. The UE includes one or more processors, and at least one memory coupled to at least one of the one or more processors. The at least one memory stores computer-executable instructions that, when executed by the at least one of the one or more processors, cause the UE to: determine whether an SDT procedure is ongoing in a case that an event for triggering a location update procedure occurs; and initiate the location update procedure in a case that the SDT procedure is not ongoing.

BRIEF DESCRIPTION OF THE DRAWINGS

Aspects of the present disclosure are best understood from the following detailed disclosure when read with the accompanying drawings. Various features are not drawn to scale. Dimensions of various features may be arbitrarily increased or reduced for clarity of discussion.

DESCRIPTION

Figure 1:
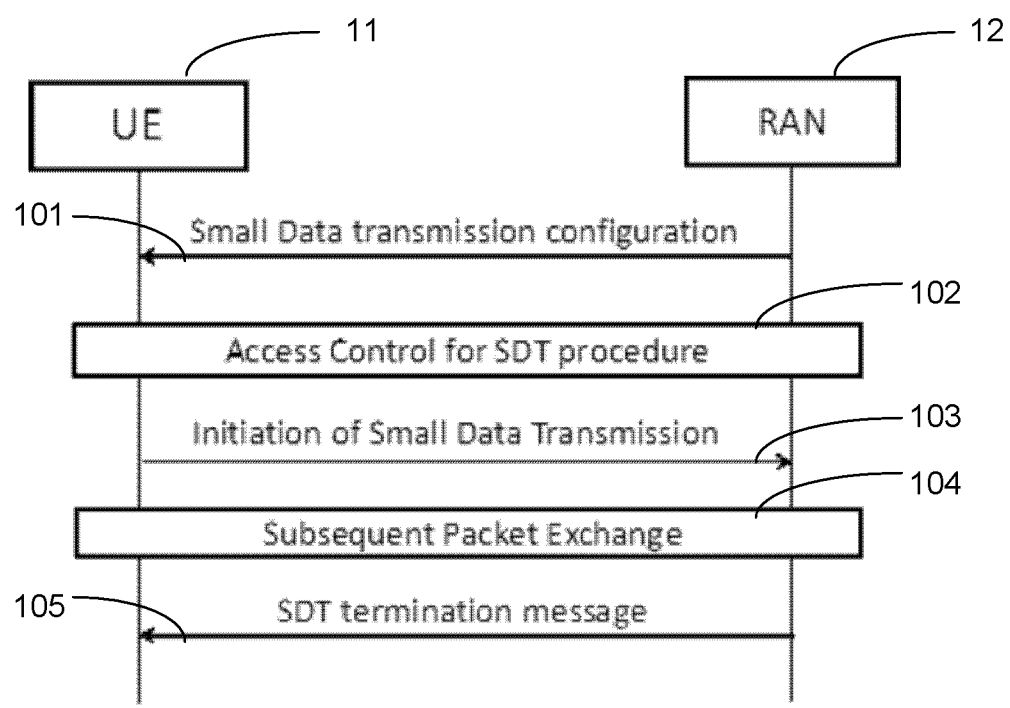
FIG. 1 is a diagram illustrating a transmission sequence of a small data transmission (SDT) procedure, according to an implementation of the present disclosure.

The following disclosure contains specific information pertaining to exemplary implementations in the present disclosure. The drawings and their accompanying detailed disclosure are directed to exemplary implementations. However, the present disclosure is not limited to these exemplary implementations. Other variations and implementations of the present disclosure will occur to those skilled in the art. Unless noted otherwise, like or corresponding elements in the drawings may be indicated by like or corresponding reference numerals. Moreover, the drawings and illustrations are generally not to scale and are not intended to correspond to actual relative dimensions.

For consistency and ease of understanding, like features are identified (although, in some examples, not shown) by reference designators in the exemplary drawings. However, the features in different implementations may be different in other respects, and therefore shall not be narrowly confined to what is shown in the drawings.

The phrases "in one implementation," and "in some implementations," may each refer to one or more of the same or different implementations. The term "coupled" is defined as connected, whether directly or indirectly via intervening components, and is not necessarily limited to physical connections. The term "comprising" may mean "including, but not necessarily limited to" and specifically indicate open-ended inclusion or membership in the disclosed combination, group, series, and equivalents.

The term "and/or" herein is only an association relationship for describing associated objects and represents that three relationships may exist, for example, A and/or B may represent that: A exists alone, A and B exist at the same time, and B exists alone. "A and/or B and/or C" may represent that at least one of A, B, and C exists, A and B exist at the same time, A and C exist at the same time, B and C exist at the same time, and A, B and C exist at the same time. Besides, the character "/" used herein generally represents that the former and latter associated objects are in an "or" relationship.

Additionally, any two or more of the following paragraphs, (sub)-bullets, points, actions, behaviors, terms, alternatives, examples, or claims in the present disclosure may be combined logically, reasonably, and properly to form a specific method. Any sentence, paragraph, (sub)-bullet, point, action, behavior, term, or claim in the present disclosure may be implemented independently and separately to form a specific method. Dependency, e.g., "based on", "more specifically", "preferably", "In one embodiment", "In one implementation", "In one alternative", in the present disclosure may refer to just one possible example that would not restrict the specific method.

For a non-limiting explanation, specific details, such as functional entities, techniques, protocols, standards, and the like, are set forth for providing an understanding of the disclosed technology. In other examples, detailed disclosure of well-known methods, technologies, systems, and architectures are omitted so as not to obscure the present disclosure with unnecessary details.

Persons skilled in the art will recognize that any disclosed network function(s) or algorithm(s) may be implemented by hardware, software, or a combination of software and hardware. Disclosed functions may correspond to modules that may be software, hardware, firmware, or any combination thereof. The software implementation may include computer-executable instructions stored on a computer-readable medium, such as memory or other types of storage devices. For example, one or more microprocessors or general-purpose computers with communication processing capability may be programmed with corresponding executable instructions and carry out the disclosed network function(s) or algorithm(s). The microprocessors or general-purpose computers may be formed of Application-Specific Integrated Circuits (ASICs), programmable logic arrays, and/or one or more Digital Signal Processors (DSPs). Although some of the disclosed implementations are directed to software installed and executing on computer hardware, nevertheless, alternative implementations, such as firmware, as hardware, or as a combination of hardware and software, are well within the scope of the present disclosure.

The computer-readable medium may include, but may not be limited to, Random Access Memory (RAM), Read-Only Memory (ROM), Erasable Programmable Read-Only Memory (EPROM), Electrically Erasable Programmable Read-Only Memory (EEPROM), flash memory, Compact Disc (CD) Read-Only Memory (CD-ROM), magnetic cassettes, magnetic tape, magnetic disk storage, or any other equivalent medium capable of storing computer-readable instructions.

A radio communication network architecture (e.g., a Long-Term Evolution (LTE) system, an LTE-Advanced (LTE-A) system, an LTE-Advanced Pro system, or a New Radio (NR) system) may typically include at least one base station (BS), at least one UE, and one or more optional network elements that provide connection with a network. The UE may communicate with the network (e.g., a Core Network (CN), an Evolved Packet Core (EPC) network, an Evolved Universal Terrestrial Radio Access Network (E-UTRAN), a Next-Generation Core (NGC), a 5G Core (5GC), or an internet) via a Radio Access Network (RAN) established by one or more B Ss.

A UE according to the present disclosure may include, but is not limited to, a mobile station, a mobile terminal or device, or a user communication radio terminal. For example, a UE may be a portable radio equipment that includes, but is not limited to, a mobile phone, a tablet, a wearable device, a sensor, or a Personal Digital Assistant (PDA) with wireless communication capability. The UE may be configured to receive and transmit signals over an air interface to one or more cells in a RAN.

A BS may include, but is not limited to, a node B (NB) as in the Universal Mobile Telecommunication System (UMTS), an evolved node B (eNB) as in the LTE-A, a Radio Network Controller (RNC) as in the UMTS, a Base Station Controller (BSC) as in the Global System for Mobile communications (GSM)/GSM Enhanced Data rates for GSM Evolution (EDGE) RAN (GERAN), a next-generation eNB (ng-eNB) as in an Evolved Universal Terrestrial Radio Access (E-UTRA) BS in connection with the 5GC, a next-generation Node B (gNB) as in the 5G-RAN (or in the 5G Access Network (5G-AN)), and any other apparatus capable of controlling radio communication and managing radio resources within a cell. The BS may connect to serve the one or more UEs via a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UMTS (often referred to as 3G) according to basic Wideband-Code Division Multiple Access (W-CDMA), High-Speed Packet Access (HSPA), LTE, LTE-A, enhanced LTE (eLTE), NR (often referred to as 5G), and/or LTE-A Pro. However, the scope of the present disclosure is not limited to these protocols.

The BS may be operable to provide radio coverage to a specific geographical area using a plurality of cells forming the RAN. The BS may support the operations of the cells. Each cell may be operable to provide services to at least one UE within its radio coverage. More specifically, each cell (often referred to as a serving cell) may provide services to one or more UEs within its radio coverage (e.g., each cell schedules the downlink (DL) and optionally uplink (UL) resources to at least one UE within its radio coverage for DL and optionally UL packet transmissions). The BS may communicate with one or more UEs in the radio communication system via the plurality of cells.

A cell may allocate Sidelink (SL) resources for supporting Proximity Service (ProSe), LTE SL services, and LTE/NR Vehicle-to-Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be called as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As disclosed previously, the frame structure for NR is to support flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the 3rd Generation Partnership Project (3GPP), may serve as a baseline for an NR waveform. The scalable OFDM numerology, such as the adaptive sub-carrier spacing, the channel bandwidth, and the cyclic prefix (CP), may also be used. Additionally, two coding schemes are applied for NR: (1) low-density parity-check (LDPC) code and (2) polar code. The coding scheme adaption may be configured based on the channel conditions and/or the service applications.

Moreover, in a transmission time interval of a single NR frame, at least DL transmission data, a guard period, and UL transmission data should be included. The respective portions of the DL transmission data, the guard period, and the UL transmission data should also be configurable, for example, based on the network dynamics of NR. An SL resource may also be provided via an NR frame to support ProSe services or V2X services.

FIG. 1 is a diagram illustrating a transmission sequence of a small data transmission (SDT) procedure, according to an implementation of the present disclosure. FIG. 1 illustrates the SDT procedure with the access control mechanism when the UE 11 initiates the SDT procedure with the serving RAN 12. In step 101, the UE 11 receives the SDT configuration from its serving cell, which is part of the serving RAN 12 of the UE 11, when the UE 11 stays in the RRC connected state. In some implementations, the serving cell may transmit the SDT configuration via a UE-specific Radio Resource Control (RRC) signal, such as RRCReconfiguration message and/or RRCRelease message (e.g., RRC Release message with the 'suspend configuration' IE, which is used to instruct the UE 11 to move to the RRC inactive state). After the UE 11 receives the SDT configuration, the UE 11 may move to the RRC inactive state with the stored SDT configuration. In some implementations, the SDT configuration may include any combinations of:

(1) One or more random access resource configuration (e.g., the locations of Physical Resource Blocks (PRBs) and/or specific preamble sets for the UE 11 to transmit (selected) preamble and/or multiplexed data and preamble sets which the UE 11 can select to transmit to the serving cell during a random access (RA) procedure). In some implementations, the random access resource configuration may include the radio resource configuration for the UE 11 to initiate a 2-step RA procedure and/or the radio resource configuration for the UE 11 to initiate a 4-step RA procedure.

In some implementations, the random access resource configuration for the SDT procedures is called RA-SDT configuration, so the SDT procedure implemented via the 2-step/4-step RA procedure is called the RA-SDT procedure. In some implementations, the UE 11 may receive the RA-SDT configuration from its serving cell via broadcasting system information (e.g., via the SystemInformationBlock1 (SIB1) or a SIB specific for the SDT configuration (e.g., SDT-specific SIB, which may be configured as other SI by the serving cell)). In addition, for the SDT-specific SIB that includes the RA-SDT configuration for the serving cell, the UE 11 may receive the SDT-specific SIB via a dedicated SIB request procedure (and so the serving cell may reply the SDT-specific SIB to the UE 11 via UE-specific control signaling) or via a system information (SI) on-demand procedure (and so the serving cell may reply the SDT-specific SIB to the UE 11 via broadcasting SDT-specific SIB). In some additional implementations, the UE may receive UE-specific RA-SDT configuration by receiving UE-specific control signaling from its serving cell.

(2) One or more (Type 1) uplink (UL) configured grant (CG) configuration (e.g., the locations of PRBs for the UE 11 to transmit the UL control signal (e.g., RRCResumeRequest message) with multiplexed data via the configured Type 1 UL-CG configuration). In some implementations, the PRBs for the UL-CG configuration may appear periodically in a time domain, so the UE 11 may take advantage of the UL-CG configuration for the SDT procedures once there are available pending packets (e.g., or called small data, UL packet, (small) packet(s), or small packet(s) in this disclosure). In some implementations, the Type 1 UL-CG configuration for the SDT procedures is also called CG-SDT configuration, so the SDT procedure implemented via Type 1 UL-CG configuration is also called CG-SDT procedure. In some implementations, the UE may receive a UE-specific CG-SDT configuration by receiving UE-specific control signaling from its serving cell.

In some implementations, the SDT configuration may further indicate one or more logical channels that are available/allowed/enabled for the SDT procedure. Thus, when one or more packets arrive at the Layer 2 (e.g., the Medium Access Control (MAC) entity), the MAC entity may identify which logical channels that the arrived packets are associated with. The UE 11 may decide to initiate a SDT procedure if there is (at least) a pending packet in one or more logical channels that are enabled/configured for the SDT procedure (e.g., when the UE 11 is in the RRC inactive state). In contrast, the UE 11 may initiate the RRC resume procedure with its serving cell if there is (at least) a pending packet in one or more logical channels that are not enabled for the SDT procedure when the UE 11 is in the RRC inactive state. In step 102, the UE 11 may (optionally) perform the access control mechanism (e.g., unified access control (UAC) mechanism) for the SDT initiation after the UE 11 observes one or more pending packets in at least one logical channel enabled for the SDT procedure. The UE 11 may initiate the SDT procedure with the serving cell if the UE 11 passes the access control mechanisms for the SDT procedure (e.g., UAC result is pass and/or when the total pending uplink packets allowed for SDT is lower or equivalent to a given data threshold). In contrast, the UE 11 may (temporally) not be able to initiate the SDT procedure if the UE 11 does not pass the access control mechanism.

In step 103, the UE 11 may initiate the SDT procedure with its serving cell if the UE 11 passes the access control mechanism. Please note, the UE 11 may perform step 103 via different approaches. In some implementations, the UE 11 may initiate a CG-SDT procedure by access (at least) one UL-CG physical resource to transmit a UL packet (with/without multiplexing with an RRCResumeRequest message, which includes a UE-ID (e.g., Inactive-Radio Network Temporary Identifier (I-RNTI)) for the serving cell to identify the transmitter of the UL packet). In some implementations, the UE 11 may initiate an RA-SDT procedure by accessing (at least) one RA physical resource to transmit a UL packet (with/without multiplexing with an RRCResumeRequest message, which includes a UE-ID (e.g., I-RNTI) for the serving cell to identify the transmitter of the UL packet). In some implementations, the RA-SDT procedure may be implemented via a 4-step RA procedure (e.g., the UE 11 may transmit the UL packet with/without multiplexed RRCResumeRequest message in the MSG3 during a 4-step RA procedure), so step 103 is implemented via the MSG3 transmission from the UE 11 to the serving cell. In some other implementations, the RA-SDT procedure may be implemented via a 2-step RA procedure (e.g., the UE 11 may transmit the UL packet with/without multiplexed RRCResumeRequest message in the MSGA during a 2-step RA procedure), so step 103 is implemented via the MSGA transmission from the UE 11 to the serving cell. After the serving cell receives the UL packet in step 103, the serving cell may transmit a Layer 1 ACK/NACK message (e.g., a Hybrid Automatic Repeat reQuest (HARQ) ACK/NACK message) to inform the UE 11 whether the UL packet has been received by the serving cell successfully. In some implementations, the serving cell may further configure dynamic DL assignment(s)/UL grant(s), which may be transmitted via Downlink Control Information (DCI) in Physical Downlink Control Channels (PDCCHs), to the UE 11 (as shown in step 104) to extend the running SDT procedure. Therefore, during the subsequent packet exchange, the UE 11 may receive one DL packet based on the received dynamic downlink assignment (via (at least) one DCI) and then the UE 11 may reply with a HARQ ACK/NACK message to the serving cell (also based on the received DCI associated with the DL packet). In addition, during the subsequent packet exchange, the UE 11 may transmit one UL packet based on the received dynamic UL grant (via (at least) one DCI), and then the UE 11 may wait for the serving cell to reply with a HARQ ACK/NACK message for the UL packet (also based on the received DCI associated with the UL packet). Please also note, during the SDT procedure (and the subsequent packet exchange), the UE 11 and serving cell may further exchange Layer 2 ACK/NACK messages (e.g., ARQ ACK/NACK messages) for DL/UL packet exchange.

At step 105, the serving cell may transmit (at least) one SDT termination message to the UE 11 to terminate the running SDT procedure (which may or may not include the subsequent packet exchange at step 104). In some implementations, the serving cell may transmit the RRC Release message (e.g., RRCRelease message with the 'suspend configuration' Information Element (IE)) to instruct the UE 11 to finish the running SDT procedure and stay in the RRC inactive state. In some implementations, the serving cell may transmit one RRC Release message (e.g., RRCRelease message without the 'suspend configuration' IE) to instruct the UE 11 to finish the running SDT procedure and move to the RRC idle state. In some other implementations, the serving cell may transmit one RRC Resume message (or RRC re-establishment message) to instruct the UE 11 to finish the running SDT procedure and move to the RRC connected state. In some additional implementations, the serving cell may transmit one RRC Setup message to instruct the UE 11 to finish the running SDT procedure and move to the RRC idle state to re-connect with the serving cell.

Please also note, the UE 11 may re-select its serving cell within the serving RAN 12 during the steps in FIG. 1. In some implementations, the UE 11 may receive the SDT configuration from the serving cell #1, and then may move and re-select to another the cell #2 as the UE's serving cell. In this condition, the UE 11 may perform the access control mechanism with the serving cell #2 in step 102. In some implementations, the UE 11 may re-select to another cell (e.g., the cell #3) during the SDT procedure (or during the subsequent packet exchange). In some implementations, the UE 11 may interrupt the running SDT procedure (and the subsequent packet exchange) and stay in the RRC inactive state (and the stored SDT configuration may or may not be kept by the UE 11 after the UE 11 re-selects to the cell #3) if the cell re-selection is performed during the SDT procedure. In some implementations, the UE 11 may interrupt the running SDT procedure (and the subsequent packet exchange) and move to the RRC idle state (and the stored SDT configuration may not be kept by the UE 11 after the UE 11 moves to the RRC idle state) if the cell re-selection is performed during the SDT procedure.

Please also note, the SDT procedure as illustrated in FIG. 1 may be an RRC-embedded SDT procedure or an RRC-less SDT procedure, which is differentiated by whether the UE 11 generates and multiplexes RRCResumeRequest message with the pending UL packet in step 103.

Figure 2:
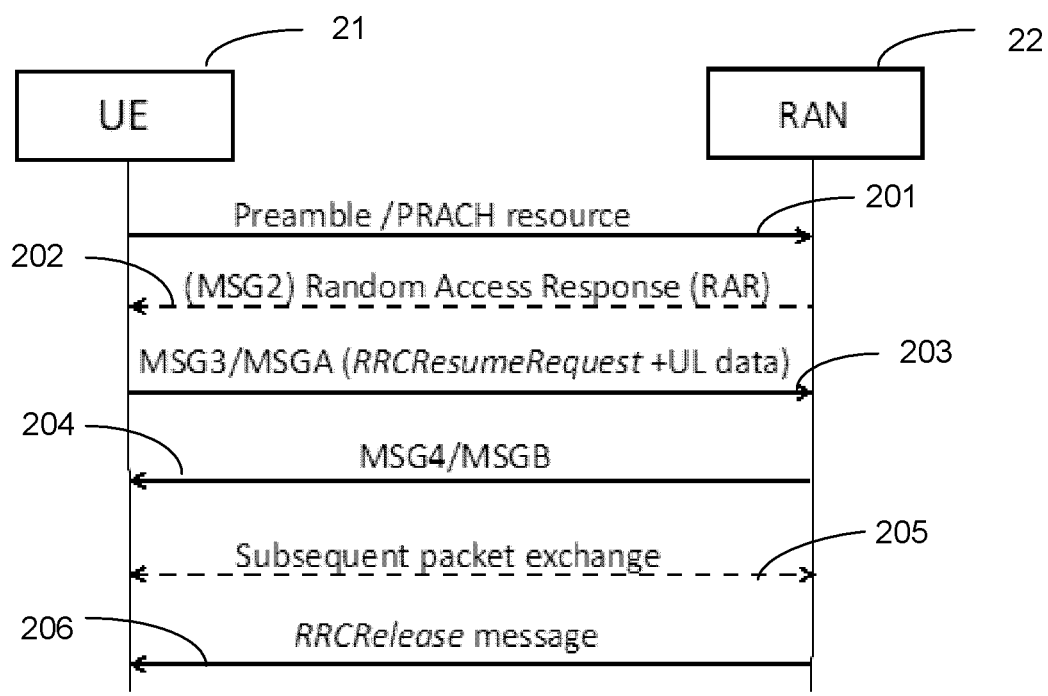
FIG. 2 is a diagram illustrating a transmission sequence of a random access (RA) based SDT procedure, according to an implementation of the present disclosure.

FIG. 2 is a diagram illustrating a transmission sequence of a RA-based SDT procedure, according to an implementation of the present disclosure. Firstly, the UE 21 may stay in the RRC inactive state with the stored SDT configuration after the UE 21 receives the RRC Release message from its serving cell, which is part of the serving RAN 22. When the UE 21 in the RRC inactive state has UL data available for transmission and the UE 21 passes the access control mechanisms for the SDT procedure. The UE 21 may initiate the RA-SDT procedure for the transmission of the UL data (e.g., in a case that the CG-SDT configuration is considered as not valid). The UE 21 may select either 4-step RA type or 2-step RA type for the RA-SDT procedure. Moreover, the preamble/Physical Random Access CHannel (PRACH) resource for RA-based SDT procedure (e.g., RA preamble/PRACH resource configured for the SDT procedure) and normal RA procedure (e.g., RA preamble not configured for the SDT procedure) may be different. Here, the UE 21 may select the RA preamble (for MSG1 transmission, as shown in step 201)/PRACH resource configured for RA-SDT procedures.

As shown in step 202, after the UE 21 transmits the RA preamble in step 201, the UE 21 may wait for the response (e.g., a Random Access Response (RAR) message) from its serving cell when the RA-SDT procedure is implemented via a contention-based (CB) 4-step RA procedure. The RAR message (e.g., MSG2) received in step 202 may further include a UL dynamic grant for the UE 21 to transmit the MSG3 in step 203. In step 203, the UE 21 may transmit an RRC message (e.g., a Common Control Channel message), MAC CE(s), and/or UL data through the MSG3 (when 4-step RA type is selected for the RA-SDT procedure) or the MSGA (when 2-step RA type is selected for the RA-SDT procedure). The RRC message may be the RRCResumeRequest message. In addition to the RRC message, MAC CE (e.g., Buffer Status Report) and UL data (e.g., data associated with DRB(s)/SRB(s) for the SDT procedure) may be included in the MSG3/MSGA as well. Please also note, in FIG. 2, the 2-step RA procedure (for the SDT procedure) is implemented by merging step 201 and step 203 in a PRACH resource pre-configured for the 2-step RA procedure (so step 202 may be omitted during the 2-step RA procedure).

Once the MSG3/MSGA is transmitted, the UE 21 may monitor Temporary Cell-RNTI (C-RNTI)/C-RNTI/RA-RNTI/MSGB-RNTI/I-RNTI for the MSG4/MSGB (as shown in step 204), in which the contention resolution ID is carried. In addition, the RAN may transmit an RRC message in the MSG4 (when the 4-step RA type is selected for the RA-SDT procedure)/MSGB (when the 2-step RA type is selected for the RA-SDT procedure). The RRC message may be an RRCRelease message (with suspendConfig IE) or an RRCResume message. The UE 21 may stay in the RRC inactive state if it receives an RRCRelease message (with suspendConfig IE), so the running RA-SDT procedure may be terminated. In some implementations, the RA-SDT procedure may be considered successfully completed after the UE 21 receives the MSG4/MSGB successfully (e.g., as an ACK message from the serving cell to indicate that the UL data in the MSG3/MSGA has been received by the serving RAN successfully). However, in some implementations, as shown in step 205, the RA-SDT procedure may be further extended (or a new subsequent packet exchange procedure is started after the RA-SDT procedure is terminated). For example, in step 205, the UE 21 may monitor a specific RNTI (e.g., C-RNTI) on a specific search space for subsequent packet exchange. In some implementations, the serving cell may transmit one or more UL dynamic grants in step 204/step 205 for the subsequent packet exchange. The subsequent packet exchange may be the transmission of multiple UL and/or DL packets as part of the SDT procedure and without transitioning to the RRC connected state (e.g., the UE 21 is still in the RRC inactive state). The UE 21 may monitor PDCCH via a specific RNTI (e.g., C-RNTI) to receive the dynamic scheduling for a UL and/or DL new transmission and/or the corresponding packet retransmission (e.g., HARQ re-transmissions and/or ARQ re-transmissions). Please also note, in some implementations, the UE 21 may perform the contention resolution procedure in step 204 when the UE 21 initiates the contention-based random access (CBRA) procedure for the SDT procedure. It is because the physical RA resources (e.g., PRBs and preamble selected by UE 21 in step 201 (for a contention-based 4-step RA procedure)/203 (for a contention-based 2-step RA procedure)) may collide with one or more other UE(s) served by the same RAN 22. So, for the contention resolution procedure, the UE 21 may further check the response message from the serving RAN 22 in step 204 (e.g., by checking the UE-ID, such as C-RNTI/I-RNTI, or control information associated with the UE-ID of the target receiver indicated in the MSG4/MSGB). UE 21 would decide a collision/congestion event happens if the UE 21 finds out the target receiver UE of the MSG4/MSGB is not UE 21 and then the UE 21 would consider that this RA procedure fails. After the running CBRA procedure fails, the UE 21 may consider initiating another (2-step/4-step) RA procedure for the SDT procedure later. In contrast, the UE 21 would consider the CBRA procedure successful if the UE 21 finds out the UE-ID or control information associated with the UE-ID of the target receiver indicated in the MSG4/MSGB matches with the UE-ID of UE 21.

In step 206, the serving RAN 22 may send an RRCRelease (with suspendConfig IE) message to keep the UE 21 in the RRC inactive state. Once the RRCRelease message (with suspendConfig IE) is received, the UE 21 may terminate the RA-SDT procedure based on the RRCRelease message, and/or stop monitoring the C-RNTI, and stay in the RRC inactive state.

Please also note, the SDT procedure as illustrated in FIG. 2 may be an RRC-embedded SDT procedure or an RRC-less SDT procedure, which is differentiated by whether the UE 21 generates and multiplexes an RRCResumeRequest message with the pending UL packet in step 203.

Figure 3:
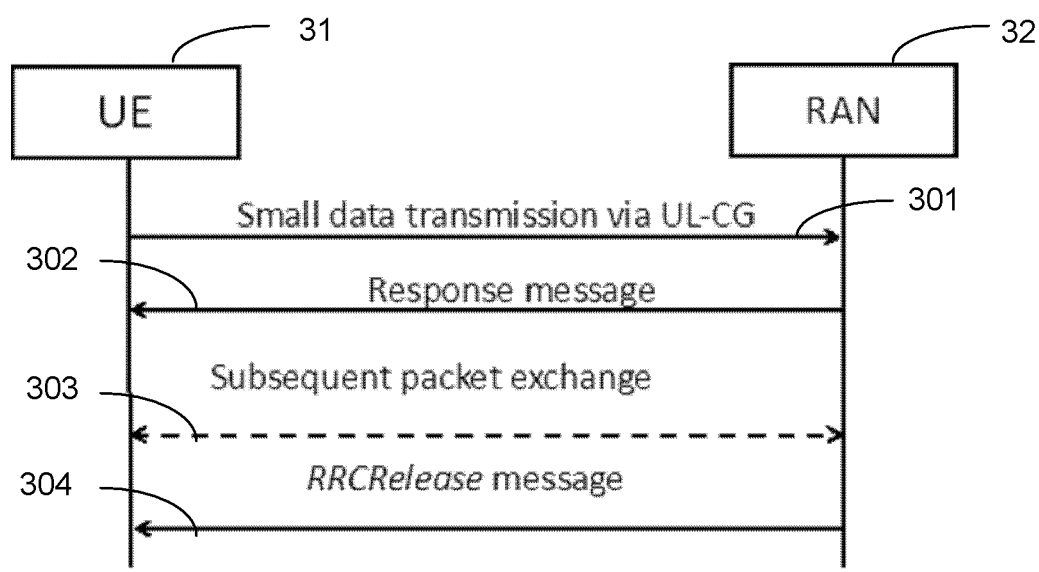
FIG. 3 is a diagram illustrating a transmission sequence of a configured grant (CG) SDT procedure, according to an implementation of the present disclosure.

FIG. 3 is a diagram illustrating a transmission sequence of a CG-SDT procedure, according to an implementation of the present disclosure. In one example, the serving RAN 32 may decide to move the UE 31 to the RRC inactive state by sending an RRCRelease message (including suspendConfig IE) to the UE 31 (e.g., in step 101 of FIG. 1). The RRCRelease message may include at least a UL-CG configuration to configure the UL-CG resources to the UE 31. The CG configuration may include, but is not limited to, the following information: CG periodicity, Transport Block (TB) Size, the maximum number for the implicit release of the (un-used/skipped) CG resources, CG Timer, retransmission timer, the number of HARQ processes reserved for CG in the SDT procedure, Reference Signal Receiving Power (RSRP) threshold for Synchronization Signal/PBCH block (SSB) selection and association between SSB and CG resources, and time alignment (TA) related parameters (e.g., cg-SDT-TimeAlignmentTimer).

As shown in step 301, the UE 31 may perform a CG-SDT procedure based on the configured CG resources, and the UE 31 may wait for the Response message from the serving RAN 32 in step 302 (e.g., such as the HARQ ACK/NACK message for the UL packet transmitted in step 301). In some implementations, the serving cell of the UE 31, which is also part of the serving RAN 32, may transmit an RRCRelease message (with the 'suspend configuration' IE) to the UE 31. After the UE 31 receives the RRCRelease message in step 302, the UE 31 may terminate the CG-SDT procedure.

In some implementations, subsequent packet exchange may be a part of the CG-SDT procedure (e.g., the UE 31 is still in the RRC inactive state). In step 303, the UE 31 may monitor PDCCH via a specific RNTI (e.g., C-RNTI, Configured Scheduling-RNTI (CS-RNTI), and/or a new RNTI for the SDT procedure) on a search space (e.g., configured as part of the SDT configuration which is specific for SDT)

to receive the dynamic scheduling for UL grant(s) and/or DL assignments and/or the corresponding retransmission (e.g., HARQ re-transmissions and/or ARQ re-transmissions). The UE 31 may monitor PDCCH via the specific RNTI to receive the dynamic scheduling for the retransmission of packet that is transmitted via the stored UL-CG configuration. The UE 31 may also perform subsequent data transmission via a CG resource according to the CG configuration (e.g., in step 101 of FIG. 1). In step 304, the serving RAN 32 may send the RRCRelease message (with suspendConfig IE) to keep the UE 31 in the RRC inactive state. Once the RRCRelease message (with suspendConfig IE) is received, the UE 31 may terminate the CG-SDT procedure based on the RRCRelease message.

Please also note, the SDT procedure as illustrated in FIG. 3 may be an RRC-embedded SDT procedure or an RRC-less SDT procedure, which is differentiated by whether the UE 31 generates and multiplexes an RRCResumeRequest message with the pending UL packet in step 301.

Figure 4:
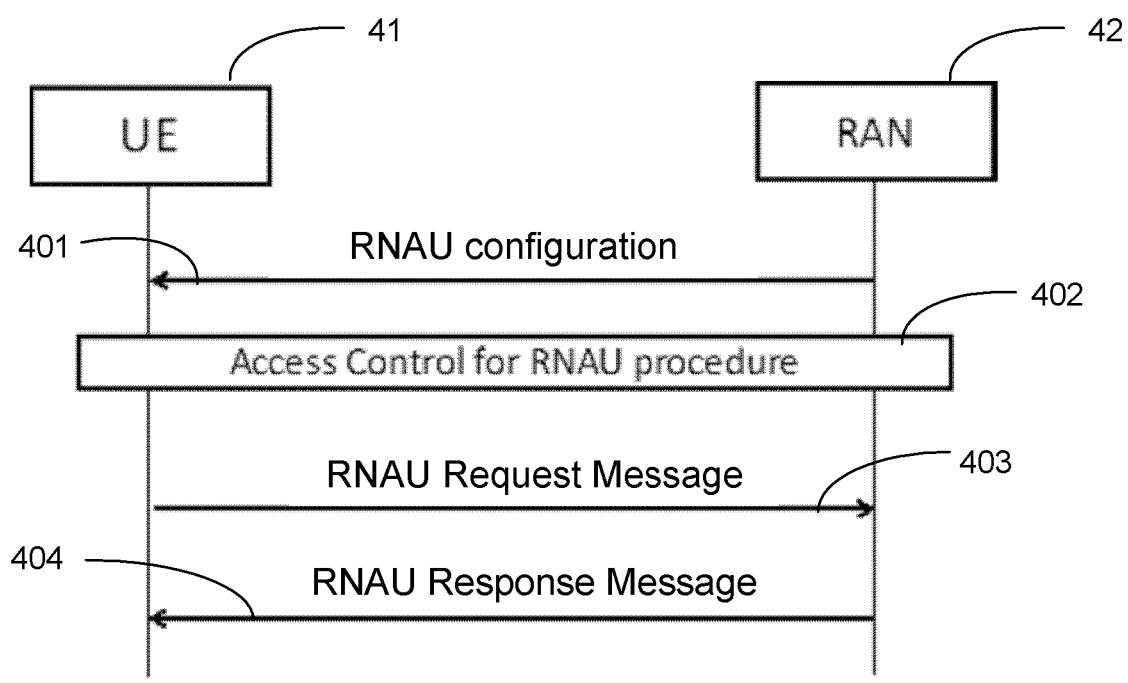
FIG. 4 is a diagram illustrating a transmission sequence of a radio access network (RAN) Notification Area Update (RNAU) procedure, according to an implementation of the present disclosure.

FIG. 4 is a diagram illustrating a transmission sequence of a RAN Notification Area Update (RNAU) procedure, according to an implementation of the present disclosure. In step 401, the UE 41 may receive the RNAU configuration from the serving cell, which is part of the serving RAN 42, when the serving cell instructs the UE 41 to move to the RRC inactive state (e.g., via RRCRelease message that includes the RNAU configuration). The RNAU configuration may include one (optional) T380 value and/or RAN Notification Area configuration. In some implementations, the RAN Notification Area configuration may be composed by one or more cell identities and/or one or more tracking area codes. In addition, each cell identity or tracking area code may be further associated with the network (e.g., Public Land Mobile Network (PLMN), Stand-alone Non-Public Network (SNPN), or Public Network Integrated Non-Public Network (PNI-NPN)) supported by the cell. Then, the UE 41 may move to the RRC inactive state with the stored RNAU configuration. Besides, the UE 41 may start to count one timer T380 to zero by configuring the initial value based on the stored RNAU configuration.

In some implementations, the UE 41 may be triggered to initiate the RNAU procedure if at least one event is fulfilled: 1) the running T380 expires; or 2) the UE 41 moves out to the RAN notification area configured by the stored RNAU configuration. As shown in step 402, the UE 41 may perform access control mechanism for the initiated RNAU procedure firstly and then the UE 41 may be allowed to trigger a RA procedure (e.g., a 2-step RA procedure or a 4-step RA procedure) for the initiated RNAU procedure after the UE 41 passes the access control mechanism (e.g., the Unified Access Control (UAC) mechanism as defined in 3GPP Technical Specification (TS) 38.331). In step 403, the UE 41 transmits the RNAU Request message to the serving cell. In some implementations, the RNAU Request message may be implemented by the UE 41 by transmitting an RRCResumerequest message in the MSGA during a 2-step RA procedure. In some other implementations, the RNAU Request message may be implemented by the UE 41 by transmitting an RRCResumerequest message in the MSG3 during a 4-step RA procedure. Then, after the serving cell receives the RNAU Request message from the UE 41, the serving cell may reply to the RNAU Response message (e.g., a DL RRC message, such as an RRCResume message/RRCSetup message/RRCReject message/RRCRelease message) to the UE 41 in step 404 via the MSG4 transmission during a 4-step RA procedure or via the MSGB transmission during a 2-step RA procedure. Finally, the UE 41 may determine to move to the RRC connected state/RRC idle state or stay in the RRC inactive state based on the RNAU Response message from its serving cell. For example, the UE 41 may receive the RRCRelease message with/without an updated RNAU configuration from the serving cell, which instructs the UE 41 to stay in the RRC inactive state with the updated RNAU configuration or with the same RNAU configuration stored by the UE 41. In some other cases, the UE 41 may receive the RRCRelease message from the serving cell to instruct the UE 41 to move to the RRC idle state, so the UE 41 may release the stored RNAU configuration after the UE 41 moves to the RRC idle state). In some additional cases, the UE 41 may receive the RRCResume message from the serving cell to instruct the UE 41 to move to the RRC connected state for RRC connection resumption between the UE 41 and the serving RAN 42. In some additional cases, the UE 41 may receive the RRCReject message from the serving cell to reject the RNAU request, and the UE 41 may stay in the RRC inactive state after receiving the RRCReject message from its serving cell).

The previously mentioned SDT procedure (e.g., as shown in FIG. 1, FIG. 2 and FIG. 3) and the RNAU procedure (e.g., as shown in FIG. 4) may be optimized when the UE is enabled to implement the SDT procedure and the UE is also requested to update a UE location via the RNAU procedure. For example, the UE may want to start the RNAU procedure, but the UE that attempts to perform the RNAU procedure may be temporally barred by the access control mechanism (e.g., UAC mechanism). Then, during the time period that the RNAU procedure is barred, the UE may also be triggered to initiate the SDT procedure. Meanwhile, the UE may perform the access control mechanism for the SDT procedure, and the UE that attempts to perform the SDT procedure may be passed. In this condition, the pending RNAU procedure may be removed/released/dropped/skipped/suspended if the UE starts the SDT procedure to the serving RAN (e.g., when the UAC result of the SDT procedure is 'pass' while the RNAU procedure is suspended/barred in the UE side). However, in some implementations, the RNAU procedure may be removed/released/dropped only when the SDT procedure is performed successfully (e.g., after the UE transmits the RRCResumeRequest message to the serving cell successfully, after the UE receives a (HARQ) ACK message from the serving RAN for a transmitted UL packet during the SDT procedure). In the presented disclosure, the RNAU procedure and the SDT procedure are jointly considered for enhancement mechanisms.

An idle-mode SDT may be transmitted by the UE to the RAN in the UL direction via the following two approaches:
1. UL-CG configuration; and
2. RA procedure.

The idle mode may include NR RRC inactive state (or RRC_INACTIVE state), NR RRC idle state (or RRC_IDLE state), LTE RRC inactive state, and LTE RRC idle state (with suspended RRC configuration). It is noted that the mechanisms/implementations in this disclosure may not be limited by the previously listed RRC states.

The serving cell may pre-configure radio resources (e.g., UL-CG, physical resources, or preambles for RA procedure) to the UE, so that the UE is able to transmit UL packets to the serving cell when the UE stays in the RRC inactive state. For example, the serving cell may transmit UL-CG configuration, preamble(s), or PRACH resource(s) via the downlink (DL) control singling (e.g., by broadcasting SI or an RRC signal, such as the RRCRelease message or the RRCReconfiguration message), for the SDT in the UL direction.

In some implementations, the (small) packet(s) may be multiplexed with an RRC signal (e.g., the RRCResumeRequest or the RRCResumeRequest1 message), in a TB within the MAC layers (or the physical layer). The UE transmits the (small) packet(s) to the RAN via the RA procedure (e.g., via the MSG3 in a 4-step RA procedure or the MSGA in a 2-step RA procedure) or via the UL-CG configuration. It is noted that the (small) packet(s) multiplexed with the RRC signal may be referred to as an RRC-embedded packet transmission in the present disclosure. On the other hand, the serving RAN (e.g., the serving cell of the UE) may identify the source (e.g., the UE) of the received (small) packet(s) by decoding the RRC signal. Then, the serving cell may decode the received (small) packet(s) from the UE by using the Access Stratum (AS) security keys associated with the UE, which may be stored in the serving RAN and the UE.

In some implementations, the (small) packet(s) may not be multiplexed with an RRC signal (e.g., the RRCResumeRequest or the RRCResumeRequest1 message), in a TB. The UE transmits the (small) packet(s) to the RAN via the RA procedure (e.g., via the MSG3 or the MSGA) or via the UL-CG configuration. It is noted that the (small) packet(s) not multiplexed with the RRC signal may be referred to as an RRC-less packet transmission in the present disclosure. The serving RAN (e.g., the serving cell of the UE) may identify the source (e.g., the UE) of the received (small) packet(s) by other approaches (e.g., based on a location of the UL-CG in the time/frequency domain or a location of Random Access Channel (RACH) resource) or based on a UE-specific identity (e.g., short I-RNTI, (full) I-RNTI, C-RNTI, CS-RNTI), which may be transmitted along with the UL (small) packet(s).

The UE may be configured to perform the RRC-embedded/RRC-less packet transmission based on the explicit instructions from the serving cell (e.g., by broadcasting system information (SI) or a UE-specific RRC signal, such as the 'suspend configuration' IE contained in the RRCRelease message). In some implementations, the UE may be pre-defined/pre-configured/pre-installed/specified to perform the RRC-embedded packet transmission when the UE applies the RA procedure for (small) packet transmission and be configured/pre-configured/specified to perform the RRC-less packet transmission when the UE applies pre-configured UL grant for the SDT procedure. In some implementations, when the RA procedure for the SDT procedure is allowed/configured/enabled to the UE, the UE may determine whether to perform the RRC-embedded packet transmission or the RRC-less packet transmission based on different conditions. For example, when the UE does not have a valid UE-specific identity (e.g., short I-RNTI, (full) I-RNTI, C-RNTI, CS-RNTI), the UE may perform the RRC-embedded packet transmission. For example, when the packet size is larger than or equal to a given or pre-defined threshold, the UE may perform the RRC-less packet transmission.

In some implementations, when the pre-configured UL grant for the SDT procedure is allowed/configured, the UE may determine whether to perform the RRC-embedded packet transmission or the RRC-less packet transmission based on different conditions. For example, when the UE does not have a valid UE-specific identity (e.g., short I-RNTI, (full) I-RNTI, C-RNTI, CS-RNTI), the UE may perform the RRC-embedded packet transmission. For example, when the packet size is larger than or equal to a given or pre-defined threshold, the UE may perform the RRC-less packet transmission.

In some implementations, if both of the RA procedure for the SDT procedure and the pre-configured UL grant for the SDT procedure are allowed/configured/enabled to the UE, the UE may only perform the RRC-embedded packet transmission for the SDT procedure. In other words, the RRC-embedded packet transmission mechanism may be configured with a higher priority over the RRC-less packet transmission mechanism. Moreover, in some implementations, the UE may fall back to the RRC-less packet transmission mechanism when a failure event happens during the RRC-embedded packet transmission.

In some implementations, if the RA procedure for the SDT procedure and the pre-configured UL grant for the SDT procedure are allowed/configured/enabled to the UE, the UE may perform the RRC-less packet transmission for the SDT procedure. In other words, the RRC-less packet transmission mechanism may be configured with a higher priority over the RRC-embedded packet transmission mechanism. Moreover, in some implementations, the UE may fallback to the RRC-embedded packet transmission mechanism when a failure event happens during the RRC-less packet transmission.

In some implementations, the previously mentioned "fallback" mechanism may be applied for the scenarios where the UE is triggered to change the SDT procedure from the RRC-less packet transmission mechanism to the RRC-embedded packet transmission mechanism. In some implementations, the previously mentioned "fallback" mechanism may be applied for the scenarios where the UE is triggered to change the SDT procedure from the RRC-embedded packet transmission mechanism to the RRC-less packet transmission mechanism.

In some implementations, the previously mentioned "fallback" mechanism may be applied for the scenarios where the UE is triggered to change the SDT procedure via the UL-CG configuration to the RA procedure. In some implementations, the previously mentioned "fallback" mechanism may be applied for the scenarios where the UE is triggered to change the SDT procedure via the RA procedure to the UL-CG configuration. In addition, in some implementations, when the fallback mechanism (either a fallback from the UL-CG configuration to the RA procedure or vice versa) is enabled to the UE, the UE may not be allowed to change the RRC-embedded/RRC-less packet transmission after the UE triggers the fallback mechanism (e.g., to transmit the same TB).

In some implementations, if the UE performs the RRC-less packet transmission via one or more RA procedures for the SDT procedure, the UE may still perform the RRC-less packet transmission (e.g., by transmitting the same TB multiplexed in the MAC entity) after the UE falls back to apply the one or more UL-CGs for the SDT procedure.

In some implementations, if the UE performs the RRC-embedded packet transmission via one or more RA procedures for the SDT procedure, the UE may still perform the RRC-embedded packet transmission after the UE falls back to apply one or more UL-CGs for the SDT procedure.

In some implementations, if the UE performs the RRC-less packet transmission by one or more UL-CGs for the SDT procedure, the UE may still perform the RRC-less packet transmission after the UE falls back to initiate one or more RA procedures for the SDT procedure.

In some implementations, if the UE performs the RRC-embedded packet transmission by one or more UL-CGs for the SDT procedure, the UE may still perform the RRC-embedded packet transmission after the UE falls back to initiate one or more RA procedures for the SDT procedure.

In some implementations, the fallback mechanism may include one Information Element (IE) to explicitly configure the UE to perform the RRC-embedded packet transmission or the RRC-less packet transmission after the fallback mechanism is triggered. For example, if the fallback mechanism (e.g., switching from the UL-CG configuration for the SDT procedure to the RA procedure for the SDT procedure) is allowed/configured/enabled to the UE, the UE may be configured to perform the RRC-embedded packet transmission (by receiving one explicit indication to configure the UE to only perform the RRC-embedded packet transmission via the RA procedure).

In some implementations, the fallback mechanism may be triggered when the UE transmits the same TB. In addition, different mechanisms may be applied to transmit the same TB when the fallback mechanism is triggered. In some implementations, the fallback mechanism may be triggered when the UE transmits different TBs, so different mechanisms may be applied to transmit different TBs when the fallback mechanism is triggered.

T380 Counting Mechanism

In the RRCRelease message (e.g., as shown in step 401 of FIG. 4), the UE may be configured with a Timer, T380, for the UE to perform a periodic RAN Notification Area Update (RNAU) procedure. As illustrated in Table 1, the UE may start the counting of T380 based on the configured value (e.g., T380 value) in the RRCRelease message that instructs the UE to move to the RRC inactive state (e.g., the UE receives the RRCRelease message with suspendConfig IE). The UE may start the RNAU procedure when the UE stays in the RRC inactive state. For example, the UE may start to count T380 (e.g., by setting the initial value of T380 to the configured value (e.g., T380_Value) that is received by the UE in the RRCRelease message) to zero every time after the UE receives the RRCRelease message with the T380_Value. Then, after the counting of T380 expires, the UE may trigger the RNAU procedure with the serving cell (or the associated BS). The UE behavior for T380 counting is illustrated in Table 1. In addition, the counting of T380 may be stopped when the UE receives an RRC signal, such as the RRCResume message, the RRCSetup message, or the RRCRelease message. In some implementations, the stopped T380 may be removed/released by the UE after the UE receives an RRC signal and/or no T380_Value is configured in the received RRC signal (e.g., the UE receives the RRCRelease message without providing T380_Value, so the UE may stop the counting of T380 and then remove the stored value of T380). Please note, in some implementations, the UE may not be configured with a Timer T380 in the RRCRelease message (e.g., as shown in step 401 of FIG. 4) for the UE to perform the periodic RNAU procedure. In this condition, the UE may stop the T380 (in addition, the original stored T380_value would also be removed/released if the UE has stored a T380_value as part of stored RNAU configuration) and then UE may not perform the periodical RNAU procedure. Please also note, in some implementations, the RRC Release message that includes the RNAU configuration (e.g., as shown in step 401 of FIG. 4) may be the same signal (e.g., the same RRC Release message) that includes the SDT configuration (e.g., as shown in step 101 of FIG. 1). In some other implementations, the UE may receive the RNAU configuration (e.g., as shown in step 401 of FIG. 4) and the SDT configuration (e.g., as shown in step 101 of FIG. 1) via different RRC Release messages.

TABLE 1

| Timer | Start | Stop | Expiry |
|---|---|---|---|
| T380 | Upon reception of T380 in the RRCRelease message | Upon reception of the RRCResume, the RRCSetup or the RRCRelease | Perform the RNAU procedure |

VarPendingRNA-Update

In some implementations, the UE may perform the RNAU procedure due to T380 expiry or when the UE moves out of the stored RNA. However, the RNAU procedure may be pending or suspended in the UE. Therefore, the parameter 'VarPendingRNA-Update' (or pendingRNA-Update) may be applied in the UE.

The VarPendingRNA-Update indicates whether the RNAU procedure is pending or suspended in the UE. A BOOLEAN variable (e.g., VarPendingRNA-Update) set to true means that the RNAU procedure is pending or suspended. More details of 'VarPendingRNA-Update' IE are illustrated in Table 2.

TABLE 2

```
-- ASN1START
-- TAG-VARPENDINGRNA-UPDATE-START
VarPendingRNA-Update ::=            SEQUENCE {
    pendingRNA-Update         BOOLEAN         OPTIONAL
}
-- TAG-VARPENDINGRNA-UPDATE-STOP
-- ASN1STOP
```

The UE may set the stored VarPendingRNA-Update to true/false during the conditions as illustrated in Table 3.

TABLE 3

| UE implementations to VarPendingRNA-Update |
|---|
| 1 Condition 1: Moving to RRC idle state<br>When the UE moves to the RRC idle state, the UE may set the VarPendingRNA-Update to false if the stored VarPendingRNA-Update is set to true. |
| 2 Condition 2: RNAU procedure is barred by unified access control (UAC)<br>A resumption of the RRC connection may be triggered due to an RNA update.<br>If an access attempt is barred by UAC mechanism, the UE may set the variable VarPendingRNA-Update to true.<br>If the barring is alleviated (e.g., for Access Category '8' or Access Category '2' for RNA update procedure) and the stored VarPendingRNA-Update is true, the UE may initiate the RRC connection resume procedure with the resume cause value set to rna-Update. Thus, the RNAU procedure may be terminated. |
| 3 Condition 3: Receiving RRCReject message<br>When the UE receives the RRCReject message during the RNAU procedure (e.g., RRCResumeRequest message with resumecause = rna-Update or |

TABLE 3-continued

UE implementations to VarPendingRNA-Update

RRCResumeRequest1 message with resumecause = rna-Update), the UE may set the VarPendingRNA-Update to true.
4   Condition 4: Transmitting RRCResumeRequest message
    If the UE transmits the RRCResumeRequest (or RRCResumeRequest1) message successfully, the UE may set the VarPendingRNA-Update to false.

With the introduction of (RRC-embedded/RRC-less) packet transmissions, implementations associated with the VarPendingRNA-Update may improve the system efficiency of the UE. The detailed designs are disclosed as follows.

VarRA-Report

In some implementations, the UE may record RA related information in the VarRA-Report The VarRA-Report includes RA related information. More details of 'VarRA-Report' IE are illustrated in Table 4.

TABLE 4

```
-- ASN1START
-- TAG-VARRA-REPORT-START
VarRA-Report-r16 : :=      SEQUENCE {
    ra-ReportList-r16          RA-ReportList-r16,
    plmn-IdentityList-r16      PLMN-IdentityList-r16
}
PLMN-IdentityList-r16 : := SEQUENCE (SIZE (1. .maxPLMN) ) OF PLMN-Identity
-- TAG-VARRA-REPORT-STOP
-- ASN1STOP
```

Moreover, the contents of 'ra-ReportList-r16' IE may (at least) include the following IEs, as illustrated in Table 5.

On the other hand, the serving cell may inquire for the VarRA-Report from the UE by sending the UEInformationRequest message to the UE (e.g., by including the IE (e.g., 'ra-ReportReq=true') in the UEInformationRequest message). After the UE receives the UEInformationRequest message (with ra-ReportReq=true), the UE may report the stored VarRA-Report in the UEInformationResponse message to the serving cell. In addition, the stored VarRA-Report may be discarded (e.g., by the RRC entity of the UE) upon successful delivery of the UEInformationResponse message confirmed by a lower layer, such as the PHY layer.

Since (RRC-embedded/RRC-less) packet transmission may be performed via the RA procedure. Methods of SDT procedure with the VarRA-Report design are disclosed.

In the present disclosure, the RNAU procedure may be simultaneously performed with the SDT procedure (or the UE has the pending RNAU procedure when the UE is triggered to start the SDT procedure). It is noted that the purpose of the timer-based (e.g., T380) RNAU procedure is to provide a maximum time period to enable the serving RAN to identify the location of the UE after a period of time (e.g., T380_Value). So, the T380_Value may be considered as a maximum time period by which the RAN could tolerate

TABLE 5

```
RA-ReportList-r16 : := SEQUENCE (SIZE (1. .maxRAReport-r16) ) OF RA-Report-r16
RA-Report-r16 : :=                  SEQUENCE {
    cellId-r16                          CGI-Info-Logging-r16,
    ra-InformationCommon-r16            RA-InformationCommon-r16,
    raPurpose-r16                       ENUMERATED {accessRelated, beamFailureRecovery,
reconfigurationWithSync, ulUnSynchronized,
                                        schedulingRequestFailure,
noPUCCHResourceAvailable, requestForOtherSI,
                                        spare9, spare8, spare7, spare6, spare5,
spare4, spare3, spare2, spare1}
}
RA-InformationCommon-r16 : :=       SEQUENCE {
    absoluteFrequencyPointA-r16         ARFCN-ValueNR,
    locationAndBandwidth-r16            INTEGER (0. .37949),
    subcarrierSpacing-r16               SubcarrierSpacing,
    msg1-FrequencyStart-r16             INTEGER (0. .maxNrofPhysicalResourceBlocks-1)
OPTIONAL,
    msg1-FrequencyStartCFRA-r16         INTEGER (0. .maxNrofPhysicalResourceBlocks-1)
OPTIONAL,
    msg1-SubcarrierSpacing-r16          SubcarrierSpacing
OPTIONAL,
    msg1-SubcarrierSpacingCFRA-r16      SubcarrierSpacing
OPTIONAL,
    msg1-FDM-r16                        ENUMERATED {one, two, four, eight}
OPTIONAL,
    msg1-FDMCFRA-r16                    ENUMERATED {one, two, four, eight}
OPTIONAL,
    perRAInfoList-r16                   PerRAInfoList-r16
}
PerRAInfoList-r16 : := SEQUENCE (SIZE (1. .200) ) OF PerRAInfo-r16
PerRAInfo-r16 : :=                  CHOICE {
    perRASSBInfoList-r16                PerRASSBInfo-r16,
    perRACSI-RSInfoList-r16             PerRACSI-RSInfo-r16
}
PerRASSBInfo-r16 : :=               SEQUENCE {
    ssb-Index-r16                       SSB-Index,
    numberOfPreamblesSentOnSSB-r16      INTEGER (1. .200),
``` the UE staying in the RRC inactive state without any data (or signal) exchange. The serving RAN may identify the UE status every time when the UE resumes the RRC connection with the serving RAN.

However, from the RAN/UE's point of view, the UE in the RRC inactive state may not need to count the T380 (so that the UE does not trigger the RNAU procedure so often) since the UE may perform the SDT procedure when the UE stays in the RRC inactive state. In addition, the serving cell may identify the UE status when the UE transmits (small) packet(s) to the serving cell, no matter whether the SDT procedure is performed via the RA procedure or via the pre-configured UL-CG. However, the timer-based RNAU procedure may still be necessary since the traffic patterns of the (small) packet arrivals (for UE in the RRC inactive state) may not be predictable, so that a given threshold of time period to trigger the UE to perform the RNAU procedure may be necessary.

In some implementations (e.g., Implementation #1), a method for decreasing unnecessary RNAU procedures (so as to decrease the unnecessary power consumption and signal overhead) when the UE performs the SDT procedure is disclosed in the present disclosure.

Besides, regarding the timer-based RNAU procedure in the 3GPP technical specification, a 'pending RNA-Update' IE may impact the RNAU procedure. Thus, the impact of pendingRNA-Update is considered with the SDT procedure. The related design is disclosed in the following implementations (e.g., Implementation #3). To support RRC-embedded packet transmission, some detailed designs about the UE selecting the RRCResumeRequest/RRCResumeRequest1 message that is transmitted in the (2-step/4-step) RA procedure or the pre-configured UL-CG with (small) packet (s) is disclosed in the following implementations (e.g., Implementation #2). Besides, the optimization about VarRA-Report is disclosed in the following implementations (e.g., Implemenation #4).

Implementation #1: T380 Counting Mechanism

The T380 counting mechanisms are illustrated in Table 6.

TABLE 6

| # | Mechanism |
|---|---|
| 1 | Mechanism 1: RRC-less packet transmission via the RA procedure<br>The UE may stop/restart the (running) T380 during the (2-step/4-step) RA procedure when the UE initiates an RRC-less packet transmission (e.g., the UE may transmit the (small) packet(s) directly without embedding it in the RRCResumeRequest/RRCResumeRequest1 message). The UE may stop/restart the (running) T380 when the UE initiates the (2-step/4-step) RA procedure (e.g., the MAC entity is triggered by an upper layer to initiate the RA procedure, a preamble is delivered to the PHY layer, or the preamble is delivered by the PHY layer) or when the UE completes the (2-step/4-step) RA procedure (successfully) for RRC-less packet transmission (e.g., the RRC layer receives the response from the serving cell in the RA procedure).<br>1a. In some implementations, the UE may stop/restart the (running) T380 when the UE transmits the first UL packet during the SDT procedure, as shown in step 203 of FIG. 2.<br>1b. In some implementations, the UE may stop/restart the (running) T380 when the UE receives a (new) RRC signal (e.g., the RRCResume, RRCSetup, or RRCRelease message) in response to a successful (small) packet reception in the serving cell, after the UE transmits the (small) packet(s) (without sending the RRCResumeRequest/RRCResumeRequest1 message) to the serving cell as shown in step 104 of FIG. 1. In some other implementations, the UE may receive the RRC message that terminates the SDT procedure, as shown in step 105 of FIG. 1.<br>1c. In some implementations, the UE may stop/restart the (running) T380 if a lower layer (e.g., the MAC layer) informs an upper layer (e.g., the RRC entity of the UE) that the (small) packet(s) has been transmitted successfully (e.g., as shown in step 204 of FIG. 2).<br>In some implementations, the UE may stop/restart the (running) T380 when the UE receives the HARQ response message for the (small) packet(s) from the serving cell. In some implementations, the UE may stop/restart the (running) T380 only if (at least) one HARQ ACK message is received by the UE successfully. In some implementations, the T380 may be still active and running if the UE receives HARQ NACK message from the serving cell. In some implementations, the UE may receive the HARQ ACK/NACK message in step 204 of FIG. 2).<br>In some implementations, the UE may stop/restart the (running) T380 if either (one or more) HARQ ACK/NACK message(s) is received by the UE from the serving cell. In addition, after the UE transmits the (small) packet(s) to the serving cell (e.g., via the MSGA in the 2-step RA procedure/via the MSG3 in the 4-step RA procedure, as shown in step 203 of FIG. 2), the (running) T380 may be still running if the UE waits for the HARQ response message from the serving cell.<br>1d. In some implementations, the UE may stop/restart the T380 when the UE receives the MSG4 and/or the MSGB from the serving cell (e.g., as shown in step 204 of FIG. 2). Preferably, the MSG4 may be a response to the MSG3 in the 4-step RA procedure. The MSG4 may consist of response(s) for contention resolution. Preferably, the MSGB may be a response to MSGA in the 2-step RA procedure. MSGB may consist of response(s) for contention resolution, fallback indication(s), and backoff indication.<br>In some implementation, the UE may stop/restart the T380 when the UE determines that the RA procedure is successfully completed (e.g., after receiving the RRCRelease message in step 206 of FIG. 2).<br>1e. In some implementations, UE may keep counting the running T380 without |

TABLE 6-continued

| # | Mechanism |
|---|---|
|  | being impacted by an RA-SDT procedure (e.g., RA-SDT procedure via RRC-less packet transmission). In addition, the UE may transmit one RRCResumeRequest message for RNAU during the RA-SDT procedure if the T380 expires during the RA-SDT procedure. After transmitting the RRCResumeRequest message for RNAU procedure, the UE may receive an RRCRelease/RRCResume/RRCReject/RRCSetup message from the serving RAN also during the same RA-SDT procedure as the response of RNAU procedure. In some other implementations, the UE may skip/ignore the periodic RNAU procedure (one time) if the running T380 expires during the RA-SDT procedure (e.g., the RA-SDT procedure via RRC-less packet transmission) (Please note, in this condition, the UE may or may not set pendingRNA-Update = true while the RNAU procedure is skipped). Then, the UE may determine whether to re-start the T380 again based on a (new) RNAU configuration received in the RRCRelease message that terminates the RA-SDT procedure (via RRC-less packet transmission) (e.g., UE may re-start T380 if a T380 value is configured in the RRCRelease message which terminates the RA-SDT procedure. Otherwise, the UE would not re-start the T380). In some additional implementations, the UE may re-start the T380 again (after the T380 expires) during the RA-SDT procedure (via RRC-less packet transmission) based on the initial T380 value (e.g., T380_Value) stored in the RNAU configuration if the T380 expires during the RA-SDT procedure (so the UE skips the RNAU procedure in this condition). |
| 2 | Mechanism 2: RRC-less packet transmission via UL-CG configuration
The UE may stop/restart the (running) T380 during a UL-CG access attempt when the UE initiates an RRC-less packet transmission (e.g., the UE may transmit (small) packet(s) without embedding it in the RRCResumeRequest/RRCResumeRequest1 message via the UL-CG (or called UL-CG access attempt) (e.g., as shown in step 301 of FIG. 3). The UE may stop/restart the (running) T380 when the UE initiates the UL-CG access attempt (e.g., the MAC entity is triggered by an upper layer to initiate the UL-CG access attempt or a TB is delivered to the PHY layer or the TB is delivered by the PHY layer) or when the UE completes the UL-CG access attempt for RRC-less packet transmission (successfully) (e.g., the RRC layer receives the response from the serving cell).
2a. In some implementations, the UE may stop/restart the (running) T380 when the UE receives a new RRC signal (e.g., the RRCResume, RRCSetup, or RRCRelease message) in response to a successful (small) packet reception in the serving cell, after the UE transmits the (small) packet(s) (without the RRCResumeRequest/RRCResumeRequest1 message) in the response message from the serving cell, as shown in the step 302 of FIG. 3.
2b. The UE may stop the (running) T380 if a lower layer (e.g., the MAC layer) of the UE informs an upper layer (e.g., the RRC entity of the UE) that the (small) packet(s) has been transmitted successfully (e.g., after step 302 of FIG. 3). In some implementations, the UE may stop/restart the (running) T380 when the UE receives the HARQ response message for the (small) packet(s) after the SDT procedure via the UL-CG is performed (e.g., after step 302 of FIG. 3). More specifically, the UE may monitor the PDCCH (which is delivered by the serving cell) and/or Physical Downlink Shared CHannel (PDSCH) to receive the HARQ response message for a UL transmission via the UL-CG after the UE performs the UL transmission.
In some examples, the UE may stop/restart the (running) T380 only if a HARQ ACK message is received by the UE successfully (so the T380 may be still active and running if the UE receives HARQ NACK message from the serving cell). In some examples, the UE may stop/restart the (running) T380 if the HARQ ACK/NACK message is received by the UE from the serving cell (e.g., after step 302 of FIG. 3). In addition, after the UE transmits the (small) packet(s) to the serving cell (e.g., via the UL-CG configuration) the T380 may be still running if the UE waits for the HARQ response message from the serving cell.
2c. In some implementations, UE may keep counting the running T380 without being impacted by a CG-SDT procedure (via RRC-less packet transmission). In addition, the UE may transmit the RRCResumeRequest message for the RNAU procedure during the CG-SDT procedure if the T380 expires during the CG-SDT procedure. After transmitting the RRCResumeRequest message for the RNAU procedure, the UE may receive an RRCRelease/RRCResume/RRCReject/RRCSetup message from the serving RAN also during the same CG-SDT procedure as the response of RNAU procedure. In some other implementations, the UE may skip/ignore the periodic RNAU procedure (one time) if the running T380 expires during the CG-SDT procedure (via RRC-less packet transmission) (Please note, in this condition, the UE may or may not set pendingRNA-Update = true while the RNAU procedure is skipped). Then, the UE may determine whether to re-start the T380 again based on a (new) RNAU configuration received in the RRCRelease message that terminates the CG-SDT procedure (via RRC-less packet transmission) (e.g., UE may re-start T380 if a T380 value is configured in the RRCRelease message that terminates the CG-SDT procedure. Otherwise, the UE may not re-start the T380). In some additional implementations, the UE may re-start the T380 again (after the T380 expires) during the CG-SDT procedure (via RRC-less packet transmission) based on the initial T380 value (e.g., T380_Value) stored in the |

TABLE 6-continued

| # | Mechanism |
|---|---|
| | RNAU configuration if the T380 expires during the CG-SDT procedure (and so the UE skips the RNAU procedure in this condition). |
| 3 | Mechanism 3: RRC-embedded packet transmission via the RA procedure
The UE may stop/restart the (running) T380 during a (2-step/4-step) RA procedure when the UE initiates an RRC-embedded packet transmission (i.e., the UE may transmit (small) packet(s) embedded in the RRCResumeRequest/RRCResumeRequest1 message) (e.g., as shown in step 203 of FIG. 2). The UE may stop/restart the (running) T380 when the UE initiates the (2-step/4-step) RA procedure (e.g., the MAC entity is triggered by an upper layer to initiate the RA procedure or a preamble is delivered by the PHY layer or the preamble is delivered to the PHY layer, as shown in step 201 of FIG. 2) or when the UE (successfully) completes the (2-step/4-step) RA procedure, which the UE triggers to transmit the RRC-embedded packet transmission (e.g., the RRC entity receives one response from the serving cell in the RA procedure), as shown in step 206 of FIG. 2.
3a. In some implementations, the UE may stop/restart the (running) T380 when the UE receives a (new) RRC signal (e.g., the RRCResume, RRCSetup, or RRCRelease message) in response to a successful (small) packet reception in the serving cell (e.g., after step 204 of FIG. 2), after the UE transmits the (small) packet(s) (without sending the RRCResumeRequest/RRCResumeRequest1 message) to the serving cell.
3b. The UE may stop/restart the (running) T380 if a lower layer (e.g., the MAC layer) of the UE informs an upper layer (e.g., the RRC entity of the UE) that the (small) packet(s) has been transmitted successfully (e.g., after receiving the MSG4/MSGB in step 204 of FIG. 2). In some implementations, the UE may stop/restart the (running) T380 when the UE receives the HARQ response message for the (small) packet(s) (with the RRCResumeRequest message) (e.g., after receiving the MSG4/MSGB in step 204 of FIG. 2).
In some examples, the UE may stop/restart the (running) T380 only if (at least) one HARQ ACK message is received by the UE successfully (e.g., after receiving the MSG4/MSGB in step 204 of FIG. 2) (so the T380 may be still active and running if the UE receives the HARQ NACK message from the serving cell).
In some examples, the UE may stop/restart the (running) T380 if the HARQ ACK/NACK message is received by the UE from the serving cell (e.g., after receiving the MSG4/MSGB in step 204 of FIG. 2). In addition, after the UE transmits the (small) packet(s) (with RRCResumeRequest message) to the serving cell (e.g., via the MSGA in the 2-step RA procedure or via the MSG3 in the 4-step RA procedure, as shown in step 203 of FIG. 2) the T380 may be still running if the UE waits for the HARQ response message from the serving cell.
3c. The UE may stop/restart the T380 when the UE receives the MSG4 and/or the MSGB from the serving cell (e.g., as shown in step 204 of FIG. 2). Preferably, the MSG4 may be a response to MSG3 in the 4-step RA procedure. The MSG4 may consist of response(s) for contention resolution. Preferably, the MSGB may be a response to MSGA in the 2-step RA procedure. The MSGB may consist of response(s) for contention resolution, fallback indication(s), and backoff indication(s).
3d. In some implementations, UE may keep counting the running T380 without being impacted by a RA-SDT procedure (via RRC-embedded packet transmission). In addition, the UE may transmit the RRCResumeRequest message for RNAU during the RA-SDT procedure if the T380 expires during the RA-SDT procedure. After transmitting the RRCResumeRequest message for the RNAU procedure, the UE may receive an RRCRelease/RRCResume/RRCReject/RRCSetup message from the serving RAN also during the same RA-SDT procedure as the response of RNAU procedure.
In some other implementations, the UE may skip/ignore the periodic RNAU procedure (one time) if the running T380 expires during the RA-SDT procedure (via RRC-embedded packet transmission) (Please note, in this condition, the UE may or may not set pendingRNA-Update = true while the RNAU procedure is skipped). Then, the UE may determine whether to re-start the T380 again based on a (new) RNAU configuration received in the RRCRelease message that terminates the RA-SDT procedure (via RRC-embedded packet transmission) (e.g., UE may re-start T380 if a T380 value is configured in the RRCRelease message which terminates the RA-SDT procedure. Otherwise, the UE may not re-start the T380). In some additional implementations, the UE may re-start the T380 again (after the T380 expires) during the RA-SDT procedure (via RRC-embedded packet transmission) based on the initial T380 value (e.g., T380_Value) stored in the RNAU configuration if the T380 expires during the RA-SDT procedure (and so the UE skips the RNAU procedure in this condition). |
| 4 | Mechanism 4: RRC-embedded packet transmission via UL-CG configuration
The UE may stop or restart the (running) T380 during a UL-CG access attempt when the UE initiates an RRC-embedded packet transmission (e.g., the UE may transmit (small) packet(s) embedded in the RRCResumeRequest/RRCResumeRequest1 message via the UL-CG access attempt) (e.g., as shown in step 301 of FIG. 3). The UE may stop/restart the (running) T380 when the UE initiates the UL-CG access attempt (e.g., the MAC entity is triggered by an upper layer to initiate one or more UL-CG access attempt(s) or a TB is delivered to the PHY layer or a TB is delivered by the PHY |

TABLE 6-continued

| # | Mechanism |
|---|---|
| | layer) (e.g., as shown in step 301 of FIG. 3) or when the UE completes the UL-CG access attempt for the RRC-embedded packet transmission successfully (e.g., the RRC layer receives the response from the serving cell) (e.g., as shown in step 304 of FIG. 3).<br>4a. In some implementations, the UE may stop/restart the (running) T380 when the UE receives a (new) RRC signal (e.g., the RRCResume, RRCSetup, or RRCRelease message) in response to a successful (small) packet reception in the serving cell, after the UE transmits the (small) packet(s) (with the RRCResumeRequest/RRCResumeRequest1 message) in the response message from the serving cell (e.g., which may be transmitted by the serving cell in step 302 or step 303 of FIG. 3).<br>4b. The UE may stop/restart the (running) T380 if a lower layer (e.g., the MAC layer) of the UE informs an upper layer (e.g., the RRC entity of the UE) that the (small) packet(s) has been transmitted successfully (e.g., after receiving the Response message from the serving RAN in step 302 of FIG. 3).<br>In some implementations, the UE may stop/restart the (running) T380 when the UE receives the HARQ response message for the (small) packet(s), after the SDT procedure via the UL-CG is performed (e.g., after receiving the Response message from the serving RAN in step 302 of FIG. 3). In some examples, the UE may stop/restart the (running) T380 only if the HARQ ACK message is received by the UE successfully (so the T380 may be still active and running if the UE receives the HARQ NACK message from the serving cell). In some examples, the UE may stop/restart the (running) T380 if the HARQ ACK/NACK message is received by the UE from the serving cell. In addition, after the UE transmits the (small) packet(s) to the serving cell (e.g., via the UL-CG configuration), the T380 may be still running if the UE waits for the HARQ response message from the serving cell.<br>4c. In some implementations, UE may keep counting the running T380 without being impacted by a CG-SDT procedure (by RRC-embedded packet transmission). In addition, the UE may transmit the RRCResumeRequest message for the RNAU procedure during the CG-SDT procedure if the T380 expires during the CG-SDT procedure. After transmitting the RRCResumeRequest message for the RNAU procedure, the UE may receive an RRCRelease/RRCResume/RRCReject/RRCSetup message from the serving RAN also during the same CG-SDT procedure as the response of an RNAU procedure. In some other implementations, the UE may skip/ignore the periodic RNAU procedure (one time) if the running T380 expires during the CG-SDT procedure (via RRC-embedded packet transmission) (Please note, in this condition, the UE may or may not set pendingRNA-Update = true while the RNAU procedure is skipped). Then, the UE may determine whether to re-start the T380 again based on a (new) RNAU configuration received in the RRCRelease message which terminates the CG-SDT procedure (via RRC-embedded packet transmission) (e.g., UE may re-start T380 if a T380 value is configured in the RRCRelease message that terminates the CG-SDT procedure. Otherwise, the UE may not re-start the T380). In some additional implementations, the UE may re-start the T380 again (after the T380 expires) during the CG-SDT procedure (via RRC-embedded packet transmission) based on the initial T380 value (e.g., T380_Value) stored in the RNAU configuration if the T380 expires during the CG-SDT procedure (so the UE skips the RNAU procedure in this condition). |

In some implementations, the UE may be configured to be enabled or disabled to perform RRC-less packet transmission and/or RRC-embedded packet transmission by the serving cell. There are four methods for the configuration of the RRC-less packet transmission and/or RRC-embedded packet transmission.

1. UE-Specific

In some implementations, the configuration may be UE-specific. The UE may receive the configuration via a UE-specific RRC signal (e.g., the RRCReconfiguration or RRCRelease message). In addition, the configuration may be applied to packet transmission that is transmitted via the UL-CG or the RA procedure.

2. Resource-Associated

In some implementations, the configuration may be associated with a specific UL-CG configuration and/or a RACH resource configuration.

3. Cell-Specific

In some implementations, the configuration may be cell-specific. Moreover, the UE may receive the configuration via broadcasting SI and/or via a SI on-demand procedure.

4. Area-Specific

In some implementations, the configuration may be area-specific. For example, the UE may receive the configuration via broadcasting SI and/or via an SI on-demand procedure associated with the systeminformationareaID, which is broadcast by one or more than one cell in the serving RAN.

In some implementation, the UE may perform the RRC-less packet transmission or RRC-embedded packet transmission based on some criteria and/or some implicit ways. For example, the UE may determine whether to perform the RRC-embedded packet transmission or RRC-less packet transmission based on the size of the UL grant. For example, the UE may determine whether to perform the RRC-embedded packet transmission or RRC-less packet transmission based on whether the UE is configured with a specific UE identity (e.g., I-RNTI, C-RNTI, CS-RNTI, and/or a new RNTI for RRC-embedded or RRC-less packet transmission). For example, the UE may determine whether to perform the RRC-embedded packet transmission or RRC-less packet transmission based on a new timer. The new timer may be used for the UE to transmit the RRC-embedded packet transmission periodically. When the new timer expires, the UE needs to perform the RRC-embedded packet transmission (and the UE may restart the new timer (e.g., the T380)).

To continue, to the UE side, the previously mentioned UE location update mechanisms in the presented disclosure may be UE-specific (e.g., being configured by a UE-specific RRC signal, such as an RRCRelease message as part of the SDT configuration)/resource-associated (e.g., being configured as part of CG-SDT configuration or RA-SDT configuration)/ cell-specific (e.g., being configured by a cell-specific broadcasting system information as part of an SDT configuration)/ area-specific (e.g., being configured by a cell-specific broadcasting system information with one specific system information area ID).

It is noted that different restart approaches may be performed by the UE. In some implementations, the UE may restart the counter/timer (e.g., the T380 in Table 3) that is already stopped by the UE, to be counted to zero when the UE restarts the T380. In other implementations, the UE may restart the active counter/timer (e.g., the T380 in Table 3) that is still counting to the configured value (e.g., the initial value, T380_Value, which is received by the UE from the serving cell via a UE-specific control signal, broadcasting SI, or be pre-installed/configured in the Universal Subscriber Identity Module (USIM)). Then, after the UE sets the T380 to the initial value, the UE may keep the T380 counting to zero.

The UE may perform the RNAU procedure when the T380 expires. In some implementations, the RNAU procedure (e.g., triggered by the expiry of the T380) may be terminated by the UE when the UE receives the SDT configuration from the serving cell. For example, the counting T380 may be released and the stored T380_Value may be removed by the UE after the UE receives the SDT configuration from the serving cell. In some implementations, the counting T380 may be stopped when the UE receives the SDT configuration from the serving cell. Then, the UE may restart the T380 if the stored SDT configuration becomes invalid (e.g., when the UE (re)selects to another serving cell or the UE moves out of the valid area for the stored SDT configuration). In some additional implementations, the serving RAN may not configure T380_Value to the UE for the periodic RNAU if the serving RAN already configures the SDT configuration to the UE (e.g., in other words, the UE may not expect to trigger a periodic RNAU/ RNAU procedure if the UE is configured with the SDT configuration).

Implementation #2: RRC Resume Message Transmission for RRC-Embedded Packet Transmission Two RRC signal formats, such as the RRCResumeRequest1 and the RRCResumeRequest message, are designed respectively for the UE to request RRC connection resumption with the serving RAN. In addition, the UE may be enabled to transmit the RRC signal (e.g., the RRCResumeRequest1 message or the RRCResumeRequest message) by the (small) packet(s) to the serving cell. However, the details of the design (e.g., a signal that the UE may select when the UE wants to request RRC connection resumption via the SDT procedure) is not clearly disclosed. So, in the present disclosure, details about the SDT approach are illustrated in Table 7. Table 7 illustrates an RRC Resume message with the SDT procedure.

TABLE 7

| # | Mechanism |
|---|---|
| 1 | Default setting<br>1a. In some implementations, the UE may be pre-configured/pre-defined/pre-specified/pre-installed (e.g., pre-defined in the technical specification or pre-installed in the USIM of the UE) to transmit the RRCResumeRequest message or RRCResumeRequest1 message via the configured resources for the SDT procedure. In some implementations, the UE may be pre-configured/pre-defined/pre-specified/pre-installed (e.g., pre-defined in the technical specification or pre-installed in the USIM of the UE) to transmit the RRCResumeRequest message or RRCResumeRequest1 message via the configured resources for the SDT procedure regardless of the field "useFullResumeID" signaling in SIB1. In some implementations, if the UE is not configured/indicated which RRC message (e.g., the RRCResumeRequest message or RRCResumeRequest1 message) to use for RRC-embedded packet transmission, the UE may apply the field useFullResumeID in SIB1. That is, if the field useFullResumeID is included in SIB1, the UE may select RRCResumeRequest1 as the message used for RRC-embedded packet transmission. Otherwise, the UE may select the RRCResumeRequest as the message used for RRC-embedded packet transmission. In some implementations, a new RRC message different from the RRCResumeRequest message and different from the RRCResumeRequest1 message may be applied when the UE intends to transmit small data in the new RRC message for the SDT procedure. The UE may transmit the new RRC message over SRB0 via a new Common Control Channel (CCCH) logical channel (e.g., other than CCCH and CCCH1) associated with a Radio Link Control (RLC) Transparent Mode (TM) entity of the UE, to the network.<br>1b. In some implementations, the pre-configuration may be pre-defined in the 3GPP technical specification.<br>1c. In some implementations, the pre-configuration may be pre-defined by the serving cell (e.g., via SI delivery or UE-specific dedicated configuration by DL-RRC signal from the serving cell). In some implementations, one new 'useFullResumeID_ULpacket' IE may be configured in the SI to indicate that whether the UE should deliver the RRCResumeRequest/RRCResumeRequest1 message in the RRC-embedded packet transmission (e.g., two different IEs, such as 'useFullResumeID' and 'useFullResumeID_ULpacket', may be configured independently).<br>1d. In some implementations, in the default configuration, the UE may select RRCResumeRequest message for transmission when the UE wants to use the configured grant to resume its RRC connection with the serving cell. In some implementations, in the default configuration, the UE may select a new RRC |

TABLE 7-continued

| # | Mechanism |
|---|---|
| | message for the SDT procedure when the UE wants to use the configured grant to resume its RRC connection with the serving cell.<br>1e. In some implementations, only one Type of RRCResumeRequest message is allowed to be transmitted when the UE transmits the RRCResumeRequest message via the resources designated for the SDT procedure (e.g., the resource designated for the SDT procedure via the RA procedure or the UL-CG designated for the SDT procedure). For example, the UE may (only) select the "RRCResumeRequest1 message" (rather than the "RRCResumeRequest message") for the RRC connection resume procedure when the UE requests to resume its RRC connection by accessing the resources designed for the SDT procedure. For another example, the UE may (only) select a new RRC message (rather than the "RRCResumeRequest message" and "RRCResumeRequest1 message") for RRC connection resume procedure when the UE requests to resume its RRC connection by accessing the resources designed for the SDT procedure in the RRC inactive state.<br>1f. In some implementations, the UE may ignore the 'useFullResumeID' IE in the broadcasting SIB1 when the UE determines to transmit the RRCResumeRequest1/RRCResumeRequest message in the RRC-embedded packet transmission procedure. In some implementations, the UE may reuse the 'useFullResumeID' in the broadcast SIB1 to decide which RRC resume message to be transmitted in the RRC-embedded packet transmission. |
| 2 | 2a. In some implementations, the UE may not select the default RRCResumeRequest message.<br>2b. In some implementations, when the UL (configured) grant size is limited, the UE may select the RRCResumeRequest message, instead of RRCResumeRequest1 message (by using full Resume ID), to request RRC connection resumption from the serving cell. |

Note:
In some implementations, the UE may be (pre-)configured to apply the RRCResumeReqeust or RRCResumeRequest1 message for the RRC connection resume procedure.
In some implementations, the UE may be (pre-)configured to apply resumeIdentity (e.g., I-RNTI value, a bit sting as long as 40 bits) or short resumeIdentity (e.g., Short I-RNTI-value, a bit string as long as 24 bits).

Implementation #3: PendingRNA-Update Enhancement

The UE may set the 'pending RNA-Update' IE (or 'VarPendingRNA-Update' IE) as true when the UE is triggered to transmit RNAU request message to the serving cell (e.g., when the UE moves out of the range defined in the stored RNA or the T380 expiry) but the triggered RNAU request message may be pending in the UE due to some reasons. However, there are some issues about how the UE configures the pendingRNA-Update under different circumstances. For example, since the RRCResumeRequest message may or may not be transmitted via the SDT procedure (e.g., via the RA procedure or via a pre-allocated or pre-configured UL-CG), the 'pendingRNA-Update' modification during the SDT procedure is disclosed. In the present disclosure, several mechanisms for 'pendingRNA-Update' modification are illustrated in Table 8.

TABLE 8

| # | Mechanism |
|---|---|
| 1 | Mechanism 1: RRC-less packet transmission via the RA procedure<br>The UE may need to update the 'PendingRAN-Update' value during the (2-step/4-step) RA procedure that the UE triggers to transmit the RRC-less packet transmission (e.g., the UE transmits small data without embedding it in the RRCResumeRequest/RRCResumeRequest1 message (or without embedding it in a new RRC message)) (e.g., in step 203 of FIG. 2 or step 301 of FIG. 3). The UE may update the 'PendingRAN-Update' value when the UE initiates the (2-step/4-step) RA procedure (e.g., the MAC entity is triggered by an upper layer to initiate the RA procedure, a preamble is delivered to the PHY layer, or the preamble is delivered by the PHY layer. As shown in step 201 of FIG. 2) or when the UE completes the (2-step/4-step) RA procedure (successfully) for the RRC-less packet transmission (e.g., the RRC layer receives a response from the serving cell in the RA procedure), as shown in step 206 of FIG. 2.<br>1a. In implementations, the UE may set the PendingRNA-Update to false after the UE transmits the (small) packet(s) (without RRCResumeRequest message) to the serving cell (e.g., after step 203 of FIG. 2). In some implementations, the UE may set the PendingRNA-Update to false after the UE transmits the (small) packet(s) successfully (e.g., the UE receives HARQ ACK message for the (small) packet(s) from the serving cell) (e.g., after step 204 of FIG. 2).<br>1b. In some implementations, the UE may set the PendingRNA-Update to true if the (small) packet(s) is not transmitted successfully (e.g., the UE receives HARQ NACK message(s) continuously for the (small) packet(s) from the serving cell and the (HARQ) re-transmission has reached a maximum allowed threshold for packet transmission via the RA procedure) (e.g., after step 204 of FIG. 2).<br>1c. In some implementations, the UE may set the PendingRNA-Update to false after the UE receives the response from the serving cell (e.g., the UE receives the HARQ ACK/NACK message for the (small) packet(s) from the serving cell) (e.g., after step 204 of FIG. 2). |

TABLE 8-continued

| # | Mechanism |
|---|---|
| | 1d. In some implementations, the UE may set the PendingRNA-Update to false after the UE receives the RRCRelease/RRCSetup/RRCResume/RRCRe-establishment message from the serving cell in the response message (for indicating the (small) packet reception) from the serving cell (e.g., after step 204 or step 206 of FIG. 2).<br>1e. In some implementations, the UE may set the PendingRNA-Update to true after the UE receives an RRCReject message from the serving cell in the response message (for indicating the (small) packet reception) from the serving cell (e.g., in step 204 or step 206 of FIG. 2).<br>1f. In some implementations, the UE may set the PendingRNA-Update to false after the UE receives the MSG4 and/or MSGB from the serving cell successfully (e.g., as shown in step 204 of FIG. 2). Preferably, the MSG4 may be a response to MSG3 (including small data and/or an RRC message) in the 4-step RA procedure. Preferably, the MSGB may be a response to MSGA (including small data and/or RRC message) in the 2-step RA procedure, for contention resolution, fallback indication(s), and backoff indication(s). In some implementations, the UE sets the PendingRNA-Update to false when the UE determines that the RA procedure is successfully completed. The RA procedure may be used for transmitting the (small) packet(s).<br>1g. In some implementations, the UE state of PendingRNA-Update may not be impacted by the RA-SDT procedure (via RRC-less packet transmission) (no matter whether the RA-SDT procedure is finished successfully or not). |
| 2 | Mechanism 2: RRC-less packet transmission via the UL-CG configuration<br>The UE may need to update the 'PendingRAN-Update' value during a UL-CG access attempt (e.g., via the UL-CG configuration) which the UE triggers to transmit an RRC-less packet transmission (e.g., the UE transmits (small) packet(s) without embedding it in the RRCResumeRequest/RRCResumeRequest1 message (or without embedding it in a new RRC message)) (e.g., as shown in step 301 of FIG. 3). The UE may update the 'PendingRAN-Update' value when the UE initiates the UL-CG access attempt (e.g., the MAC entity is triggered by an upper layer to initiate a UL-CG access attempt, a TB is delivered to the PHY layer, or the TB is delivered by the PHY layer) (e.g., as shown in step 301 of FIG. 3) or when the UE completes the UL-CG access attempt for the RRC-less packet transmission (successfully) (e.g., the RRC layer receives a response from the serving cell) (e.g., as shown in step 304 of FIG. 3).<br>2a. In some implementations, the UE may set the PendingRNA-Update to false after the UE transmits the (small) packet(s) via the UL-CG configuration successfully (e.g., the UE receives HARQ ACK message for the (small) packet(s) from the serving cell) (e.g., after step 302/304 of FIG. 3).<br>2b. In some implementations, the UE may set the PendingRNA-Update to true if the (small) packet(s) is not transmitted successfully via the UL-CG configuration (e.g., the UE receives the HARQ NACK message(s) continuously for the (small) packet(s) from the serving cell (e.g., as shown in step 302/304 of FIG. 3) or the (HARQ) re-transmission has reached a maximum allowed threshold for packet transmission via the UL-CG configuration).<br>2c. In some implementations, the UE may set the PendingRNA-Update to false after the UE receives the response from the serving cell (e.g., the UE receives the HARQ ACK/NACK message for the (small) packet(s) from the serving cell) (e.g., as shown in step 302 of FIG. 3).<br>2d. In some implementations, the UE may set the PendingRNA-Update to false after the UE receives the RRCRelease/RRCSetup/RRCRe-establishment message from the serving cell in the response message (for indicating the (small) packet reception) from the serving cell after the UE has transmitted the small packet(s) via the UL-CG configuration (e.g., as shown in step 302/304 of FIG. 3).<br>2e. In some implementations, the UE may set the PendingRNA-Update to true after the UE receives the RRCReject message from the serving cell (e.g., as shown in step 302 of FIG. 3) in the response message (for indicating the (small) packet reception) from the serving cell after the UE has transmitted the (small) packet(s) via the UL-CG configuration.<br>2f. In some implementations, the UE state of PendingRNA-Update may not be impacted by the CG-SDT procedure (via RRC-less packet transmission) (no matter whether the CG-SDT procedure is finished successfully or not). |
| 3 | Mechanism 3: RRC-embedded packet transmission via the RA procedure<br>The UE may need to update the 'PendingRAN-Update' value during the (2-step/4-step) RA procedure that the UE is triggered to transmit the RRC-embedded packet transmission (e.g., the UE transmits (small) packet(s) embedded in the RRCResumeRequest/RRCResumeRequest1 message (or embedded in a new RRC message)) (e.g., as shown in step 201 of FIG. 2). The UE may update the PendingRAN-Update value when the UE initiates the (2-step/4-step) RA procedure (e.g., the MAC entity of the UE is triggered by an upper layer of the UE to initiate the RA procedure, a preamble is delivered by the PHY layer, or the preamble is delivered to the PHY layer) or when the UE (successfully) completes the (2-step/4-step) RA procedure (e.g., after step 206 of FIG. 2), which the UE triggers to transmit the RRC-embedded packet transmission (e.g., the RRC entity receives a response from the serving cell in the RA procedure).<br>3a. In implementations, the UE may set the PendingRNA-Update to false after the UE transmits the (small) packet(s) (with RRCResumeRequest message) to the |

TABLE 8-continued

| # | Mechanism |
|---|---|
| | serving cell (e.g., after step 203 of FIG. 2). In some implementations, the UE may set the PendingRNA-Update to false after the UE transmits the (small) packet(s) (with RRCResumeRequest message) successfully (e.g., the UE receives the HARQ ACK message for the (small) packet(s) (with the RRCResumeRequest/RRCResumeRequest1 message or with a new RRC message) from the serving cell) (e.g., as shown in step 204 of FIG. 2).<br>3b. In some implementations, the UE may set the PendingRNA-Update to true if the (small) packet(s) is not transmitted successfully (e.g., the UE receives the HARQ NACK message(s) continuously for the (small) packet(s) (with the RRCResumeRequest/RRCResumeRequest1 message or with a new RRC message) from the serving cell and the (HARQ) re-transmission has reached a maximum allowed threshold for packet transmission via the RA procedure) (e.g., as shown in step 204 of FIG. 2).<br>3c. In some implementations, the UE may set the PendingRNA-Update to false after the UE receives the response from the serving cell (e.g., the UE receives the HARQ ACK/NACK message for the (small) packet(s) (with the RRCResumeRequest/RRCResumeRequest1 message or with a new RRC message) from the serving cell) (e.g., as shown in step 204 of FIG. 2).<br>3d. In some implementations, the UE may set the PendingRNA-Update to false after the UE receives the RRCRelease/RRCSetup/RRCRe-establishment message from the serving cell in the response message (for indicating the (small) packetreception) from the serving cell (e.g., as shown in step 204 of FIG. 2).<br>3e. In some implementations, the UE may set the PendingRNA-Update to true after the UE receives the RRCReject message from the serving cell in the response message (for indicating the (small) packet reception with the RRCResumeRequest/RRCResumeRequest1 message (or with a new RRC message)) from the serving cell (e.g., as shown in step 204 of FIG. 2).<br>3f. In some implementations, the UE state of PendingRNA-Update would not be impacted by the RA-SDT procedure (via RRC-embedded packet transmission) (no matter whether the RA-SDT procedure is finished successfully or not). |
| 4 | Mechanism 4: RRC-embedded packet transmission via the UL-CG configuration<br>The UE may need to update the 'PendingRNA-Update' value during a UL-CG access attempt that the UE is triggered to transmit the RRC-embedded packet transmission via the UL-CG configuration (e.g., the UE transmits (small) packet(s) embedded in the RRCResumeRequest/RRCResumeRequest1 message) (e.g., after step 301 of FIG. 3). The UE may update the 'PendingRNA-Update' value when the UE initiates the UL-CG access attempt (e.g., the MAC entity is triggered by an upper layer to initiate one or more UL-CG access attempt(s), a TB is delivered to the PHY layer, or a TB is delivered by the PHY layer) or when the UE completes the UL-CG access attempt for the RRC-embedded packet transmission successfully (e.g., the RRC layer receives a response from the serving cell) (e.g., after step 302/304 of FIG. 3).<br>4a. In some implementations, the UE may set the PendingRNA-Update to false after the UE transmits the (small) packet(s) (with the RRCResumeRequest message) successfully (e.g., the UE receives the HARQ ACK message for the (small) packet(s) (with the RRCResumeRequest message) from the serving cell) (e.g., as shown in step 302 of FIG. 3).<br>4b. In some implementations, the UE may set the PendingRNA-Update to true if the (small) packet(s) is not transmitted successfully (e.g., the UE receives the HARQ NACK message(s) continuously for the (small) packet (with the RRCResumeRequest message) from the serving cell and the (HARQ) re-transmission has reached a maximum allowed threshold for packet transmission via the UL-CG configuration) (e.g., as shown in step 302 of FIG. 3).<br>4c. In some implementations, the UE may set the PendingRNA-Update to false after the UE receives the response from the serving cell (e.g., the UE receives the HARQ ACK/NACK message for the (small) packet(s) (with the RRCResumeRequest message) from the serving cell) (e.g., as shown in step 302 of FIG. 3).<br>4d. In some implementations, the UE may set the PendingRNA-Update to false after the UE receives the RRCRelease/RRCSetup/RRCRe-establishment message from the serving cell in the response message (for indicating the (small) packet reception) from the serving cell (e.g., as shown in step 304 of FIG. 3).<br>4e. In some implementations, the UE may set the PendingRNA-Update to true after the UE receives the RRCReject message from the serving cell in the response message (for indicating the (small) packet reception with the RRCResumeRequest message) from the serving cell (e.g., as shown in step 302 of FIG. 3).<br>4f. In some implementations, the UE state of PendingRNA-Update would not be impacted by the CG-SDT procedure (via RRC-embedded packet transmission) (no matter whether the CG-SDT procedure is finished successfully or not). |
| 5 | In some implementations, the PendingRNA-Update may not be modified/impacted by the RRC-less packet transmission.<br>In some implementations, the PendingRNA-Update may not be modified/impacted by the RRC-embedded packet transmission (even if the UE has transmitted the RRCResumeRequest message with the (small) packet(s) to the serving cell). |
| 6 | The UE generates the RRCResumeRequest message based on the stored 'PendingRNA-Update' value during the SDT procedure. Otherwise, in some |

TABLE 8-continued

| # | Mechanism |
|---|---|
| | implementations, the UE may initiate the RRC-less SDT procedure instead.
6a. In some implementations, the UE may determine to generate the RRCResumeRequest (or RRCResumeRequest1 message or a new RRC message associated with the SDT procedure) to be transmitted with the small data if the stored 'PendingRNA-Update = true' in the UE.
6b. In some implementations, when the RA procedure or the UL-CG access attempt is triggered for (RRC-less) packet transmission, the UE may determine whether to generate the RRCResumeRequest message to be multiplexed with the (small) packet(s) on the RA procedure/UL-CG access attempt if the stored 'PendingRNA-Update = true'. (Otherwise, the UE may perform the RRC-less packet transmission via the RA procedure/UL-CG access attempt if the stored 'PendingRNA-Update = false').
6c. In some implementations, the UE may determine to multiplex the (small) packet(s) with the RRCResumeRequest message (only) while:
the triggered RA procedure (and/or the UL-CG access attempt) is not barred by the UAC (e.g., the UAC is performed and the RA procedure/UL-CG access attempt is not barred); or
the barred RA procedure (and/or the UL-CG access attempt) is alleviated from being barred; or
the UL-CG size (e.g., in the unit of bytes or bits) is enough to transmit both of the RRCResumeRequest message and the pending packet in the UL-CG access attempt. (Otherwise, the UE may determine to transmit only the pending packet or the RRCResumeRequest message based on a pre-defined prioritization rule).
6d. In some additional implementations, the UE may trigger the UL-CG access attempt directly if the stored 'PendingRNA-Update = true'. Then, the UE may generate the RRCResumeRequest message to be transmitted via the UL-CG configuration. Moreover, the UE may set the 'PendingRNA-Update = false' after the UE transmits the RRCResumeRequest message via the UL-CG configuration successfully (e.g., success transmission informed by a lower layer of the UE). In addition, in some conditions, the (small) packet(s) may (or may not) be multiplexed with the RRCResumeRequest message when the UL-CG access attempt is triggered by the RRCResumeRequest message transmission. In contrast, in some implementations, the UE may set the 'PendingRNA-Update = true' if the UL-CG access attempt for the RRCResumeRequest message transmission fails (e.g., the packet transmission via UL-CG configuration(s) already reaches the maximum number of HARQ re-transmissions or the packet transmission already reaches the maximum number of ARQ re-transmissions, which may be pre-configured as part of the SDT configuration). Moreover, the UE may release the corresponding UL-CG configuration. |
| 7 | The UE performs an RRC procedure when RRCResumeRequest message is transmitted via the UL-CG access attempt.
After the UE transmits the RRCResumeRequest message via the pre-configured UL-CG, the UE may receive different responses from the serving cell.
In one example, the UE may receive the RRCReject message from the serving cell in the response after the UE transmits the RRCResumeRequest message to the serving cell (e.g., as shown in step 302/304 of FIG. 3). Then, the UE may set 'pendingRNA-Update = true' after the UE receives the RRCReject message from the serving cell.
In one example, the UE may receive the RRCSetup message from the serving cell in the response after the UE transmits the RRCResumeRequest message to the serving cell (e.g., as shown in step 302/304 of FIG. 3). In addition, the UE may have stored the parameter 'pendingRNA-Update = true'. Then, the UE may set 'pendingRNA-Update = false' after the UE receives the RRCSetup message in the response.
In one example, the UE may receive the RRCResume message from the serving cell in the response after the UE transmits the RRCResumeRequest message to the serving cell (e.g., as shown in step 302/304 of FUG. 3). In addition, the UE may have stored parameter 'pendingRNA-Update = true' before the UE transmits the RRCResumeRequest message to the serving cell. Then, the UE may set 'pendingRNA-Update = false' after the UE receives the RRCResume message in the response. |
| 8 | In some implementations (e.g., when the UE is configured with the UL-CG configuration and/or RACH resource for (small) packet transmission), the UE may set 'pendingRNA-Update = true' when the T380 expires. However, the UE may not trigger the RNAU procedure immediately when the counting T380 expires (e.g., when the UE is configured with CG-SDT/RA-SDT configuration). Instead, the UE may wait for the next available UL-CG configuration (or RACH resource) configured for the SDT procedure. Moreover, the UE may determine whether to generate the RRCResumeRequest message based on the stored pendingRNA-Update value (e.g., 'pendingRNA-Update = true'). In some implementations, the serving cell may enable/disable this mechanism in the SDT procedure). |
| 9 | (Collision Event & Priority Rules)
A. In some implementations, the UE may be configured with the specific priority rules to decide whether to suspend the RNAU procedure/SDT procedure when the UE is triggered with the SDT procedure and the RNAU procedure, and thus both procedures (or the access attempts (triggered by the upper layer or in the Access Stratum layer) associated with both procedures, |

TABLE 8-continued

| # | Mechanism |
|---|---|
| | respectively, such SDT attempt and RNAU attempt) may collide in the UE side. The collision event (e.g., the SDT procedure and the RNAU procedure) may happen after a cell (re)selection procedure. For example, the UE may move out of the stored RNA with the triggered SDT procedure after the UE re-selects to a serving cell and the UE is not allowed to perform both procedures simultaneously. |
| B. | In some implementations, the UE may be configured to perform the RNAU procedure firstly (e.g., RNAU attempt/RNAU procedure is configured with a high priority value), rather than an SDT procedure (e.g., the SDT attempt/SDT procedure is configured with a low priority value). Thus, when the collision event happens, the UE may start the RNAU procedure firstly, and the UE may start the SDT procedure after the RNAU procedure is finished. |
| C. | In some other implementations, the UE may be configured to implement SDT procedure firstly (e.g., SDT attempt/SDT procedure is configured with a high priority value), rather than an RNAU procedure (e.g., RNAU attempt/RNAU procedure is configured with a low priority value). Thus, when the collision event happens, the UE may start the SDT procedure firstly, and the UE may start the RNAU procedure after the SDT procedure is finished. In some conditions, the UE may skip the RNAU procedure or remove/release/ignore the RNAU procedure (e.g., with setting PendingRNA-Update = false) if UE finishes the SDT procedure with the serving RAN. |
| D. | Please note, the proposed decision rules (e.g., the UE decides to perform the RNAU procedure or the SDT procedure firstly when both procedures collide) may be implemented before the access control mechanism (e.g., the UAC mechanism) for both procedures. That is, the UE may perform the low priority procedure (e.g., the UE implements the UAC mechanism for the low priority attempt) if the high priority procedure is barred by the UAC mechanism. |
| E. | In some implementations, the proposed decision rules (e.g., the implementations as disclosed in A, B, C and D) may be applied to both types of the RNAU procedure (i.e., both the location-based RNAU procedure and the timer-based RNAU procedure). In some other implementations, the proposed decision rules may only apply to the timer-based RNAU procedure or the location-based RNAU procedure. |
| F. | In some implementations, the proposed decision rules (e.g., the implementations as disclosed in A, B, C, and D) may be applied to both types of the SDT procedure (i.e., both the RA-SDT procedure and the CG-SDT procedure). In some other implementations, the proposed decision rules may only apply to the RA-SDT procedure or the CG-SDT procedure. |
| G. | In some implementations, the UE may receive the priority rules from the serving RAN (e.g., as part of the SDT configuration or as part of the RNAU configuration) via broadcasting system information or via UE-specific DL control signaling. In some other implementations, the priority rules may be pre-installed in the USIM or pre-defined in the technical specification. In some additional implementations, the UE may decide which procedure should be performed firstly when both procedures collide. |
| 10 | Tracking Area Update (TAU) procedure |
| A. | Please note, (part of) the proposed mechanisms in the present application may also be applicable to a tracking area update (TAU) procedure when the UE is configured/allowed to perform the SDT procedure in the RRC idle state. In some implementations, a UE in the RRC Inactive state may also need to perform the TAU procedure. |

Implementation #4: VarRA-Report and VarUL-CG-Report

VarRA-Report

In some implementations, some new IEs in the VarRA-Report are disclosed when the RA procedure is triggered by the UE for the SDT procedure. Table 9 illustrates available IEs included in the VarRA-Report.

TABLE 9

| # | Mechanism |
|---|---|
| 1 | In some implementations, one new purpose as 'ULpacketTransmission' IE (or small data transmission, SDT) may be defined in 'raPurpose' IE, as illustrated as follows.<br>raPurpose-r16 ENUMERATED {accessRelated, beamFailureRecovery, reconfigurationWithSync, ulUnSynchronized, chedulingRequestFailure, noPUCCHResourceAvailable, requestForOtherSI, ULpacketTransmission, spare8, spare7, spare6, spare5, spare4, spare3, spare2, spare1}<br>}<br>So, the UE may use raPurpose = ULpacketTransmission if the RA procedure is initiated by the UE for the SDT procedure. |
| 2 | In some implementations, one new 'Num-of-ReTx' IE may be configured to be |

TABLE 9-continued

| # | Mechanism |
|---|---|
| | associated with the RA record in the VarRA-Report when the recorded RA procedure is triggered for UL packet transmission (e.g., the raPurpose = ULpacketTransmission). The 'Num-of-ReTx' IE may be used to indicate the number of re-transmissions that the UE has tried to transmit the UL packet in the corresponding RA procedure.<br>In some implementations, one 'Num-of-Tx' IE may be configured to be associated with the RA record in the VarRA-Report. The 'Num-of-Tx' IE may be used to indicate the number of transmissions (which includes initial transmission and the re-transmission(s)) that the UE has tried to transmit the UL packet in the corresponding RA procedure. |
| 3 | In some implementations, one new 'PacketSize' IE may be configured to be associated with the RA record in the VarRA-Report when the recorded RA procedure is triggered for UL packet transmission (e.g., the raPurpose = ULpacketTransmission). The 'PacketSize' IE may be used to indicate the packet size that the UE wants to transmit in the corresponding recorded RA procedure. In some cases, the 'PacketSize' IE may include the size of RRCResumeRequest message (or RRCResumeRequest1 message or a new RRC message for the SDT procedure) being transmitted with the pending packets. In some cases, the 'PacketSize' IE may not include the size of RRCResumeRequest message (or RRCResumeRequest1 message or a new RRC message for the SDT procedure) being transmitted with the pending packets. |

VarUL-CG-Report

In some implementations, the UE may release or remove the SDT procedure via one (or more) UL-CG configurations if the SDT procedure on the corresponding UL-CG configuration fails (e.g., a continuous failure event is detected when the UE tries to transmit pending packets on the corresponding UL-CG configuration). In some implementations, the UE may report the identifier(s) associated with the corresponding UL-CG configuration in the VarUL-CG-Report. The UE may transmit the VarUL-CG-Report via the UEAssistanceInformation transmission procedure or via a response from the serving cell (e.g., the VarUL-CG-Report may be included in the UEInformationResponse message replied to the serving cell after receiving the UEInformationRequest message from the serving cell) after the UE resumes the RRC connection with the serving cell. In some implementations, the UE may be triggered to perform the RRC connection resume procedure (e.g., by sending one RRCResumeRequest message with a resumecause such as 'ULpacketTx-Failure') when a packet transmission failure event happens when the UE performs an SDT procedure in the RRC inactive state. Then, after the UE resumes the RRC connection, the UE may report to the serving cell that VarUL-CG-Report is available (e.g., by transmitting the 'VarUL-CG-Report available' indicator to the serving cell). After the serving cell receives the 'VarUL-CG Report available' indicator from the UE, the serving cell may request the UE to transmit the VarUL-CG-Report to the serving cell (e.g., the UL-CG Report request message may be transmitted via a DL RRC signal). After the UE receives the UL-CG Report request message, the UE may report the stored VarUL-CG Report to the serving cell via a UL RRC signal. Moreover, the stored VarUL-CG Report may be released/removed when the stored VarUL-CG Report is delivered to the serving cell successfully.

More specifically, in some implementations, the previously mentioned VarRA-Report/VarUL-CG-Report may be transmitted via the MSG3, the MSGA, and/or CG when the UE is in the RRC_INACTIVE state. In some implementations, the VarRA-Report/VarUL-CG-Report may be triggered and/or transmitted periodically. In some implementations, the VarRA-Report/VarUL-CG-Report may be triggered and/or transmitted when the UL grant size of the MSG3, the MSGA, and/or CG is higher than (or equivalent to) a given threshold. In some implementations, the UE may obtain the value of the given threshold via broadcasting SI or a UE-specific RRC control signal. In some implementations, the value of the given threshold may be pre-defined in the 3GPP technical specification or pre-installed in USIM.

Please also note, the implementations mentioned above are applicable for NR protocols, 3GPP Radio Access Technologies (e.g., E-UTRA), and non-3GPP RATs, but are not limited herein. For example, the proposed mechanisms or implementations mentioned above may be applied for other RATs, such as E-UTRA, Wi-Fi, Bluetooth, or NR unlicensed band, E-UTRA Licensed Assisted Access (LAA), NR SL operation (e.g., NR PC5 interface), LTE V2X service, LTE ProSe, and LTE SL operation (e.g., LTE PC5 interface).

Figure 5:
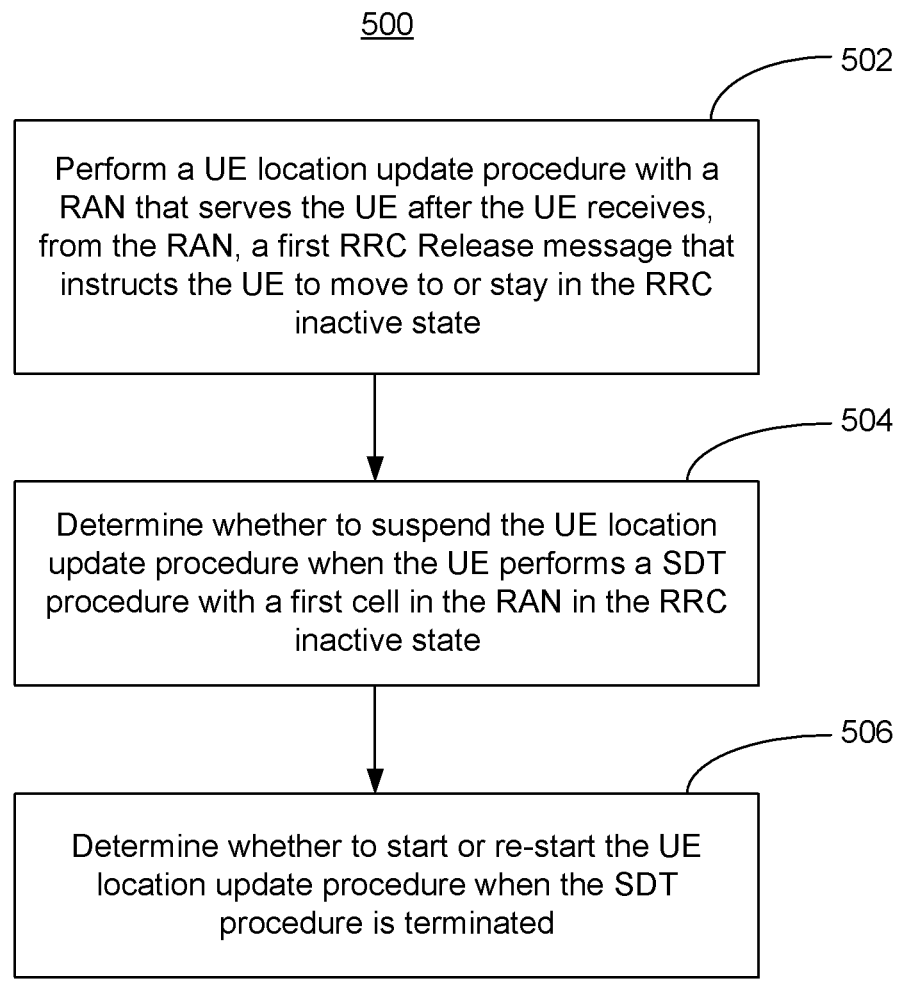
FIG. 5 is a flowchart illustrating a method for updating a location of a user equipment (UE) in a radio resource control (RRC) inactive state, according to an implementation of the present disclosure.

FIG. 5 is a flowchart illustrating a method 500 for updating a location of a UE in the RRC inactive state, according to an implementation of the present disclosure. In action 502, the UE performs a UE location update procedure (e.g., the RNAU procedure) with a RAN that serves the UE after the UE receives, from the RAN, a first RRC Release message (e.g., the RRCRelease message) that instructs the UE to move to or stay in the RRC inactive state. In action 504, the UE determines whether to suspend the UE location update procedure when the UE performs an SDT procedure (e.g., CG-SDT/RA-SDT procedure) with a first cell in the RAN in the RRC inactive state. In action 506, the UE determines whether to start or restart the UE location update procedure when the SDT procedure (e.g., an RA-SDT procedure as shown in FIG. 2 and/or a CG-SDT procedure as shown in FIG. 3) is terminated (e.g., no matter whether the result of the SDT procedure is successful, failed, or falls back to a non-SDT procedure. In some implementations, the non-SDT procedure may include an RRC Resume procedure and an RRC establishment procedure).

In some examples, the UE may suspend the UE location update procedure when the UE performs the SDT procedure, and may stop counting an RNAU timer (e.g., the T380) when the UE is performing the SDT procedure (e.g., CG-SDT/RA-SDT procedure), where the RNAU timer is started by the UE after the UE receives the first RRC Release message. Therefore, the UE may not perform the UE location update procedure during the SDT procedure by stopping the RNAU timer.

In some examples, the UE may restart to count the stopped RNAU timer after the UE terminates the SDT procedure.

In some examples, the UE may keep counting the RNAU timer (e.g., T380) when the UE performs the SDT procedure, where the RNAU timer is started by the UE after the UE receives the first RRC Release message, and the UE may suspend the RNAU procedure when the RNAU timer expires during the SDT procedure.

In some examples, the UE may restart to count the RNAU timer after the UE terminates the SDT procedure.

In some examples, the UE may suspend the RNAU procedure when the UE restarts another SDT procedure with a second cell that does not belong to a RAN notification area stored in the UE, after the UE re-selects to the second cell in the RAN via a cell re-selection procedure.

In some examples, the UE may update a RNAU configuration stored in the UE after the UE terminates the SDT procedure by receiving a second RRC Release message that includes an RNAU configuration, from the first cell, and may start an RNAU timer based on the updated RNAU configuration.

In some examples, the UE may perform the SDT procedure via the 2-step/4-step random access procedure, or via one or more UL-CG configurations stored in the UE.

In some examples, the UE may extend the SDT procedure when the UE receives at least one of one or more DL and UL dynamic grants that are configured by the first cell during the SDT procedure.

In some examples, the UE may set a pending RNA record (e.g., PendingRNA-Update) to 'false' after the UE transmits an RRC Resume Request message (e.g., RRCResumeRequest message or RRCResumeRequest1) to the first cell successfully during the SDT procedure.

In some examples, the UE may set a pending RNA record (e.g., PendingRNA-Update) to 'true' when the UE receives an RRC Reject message (e.g., RRCReject message) from the first cell successfully during the SDT procedure.

Figure 6:
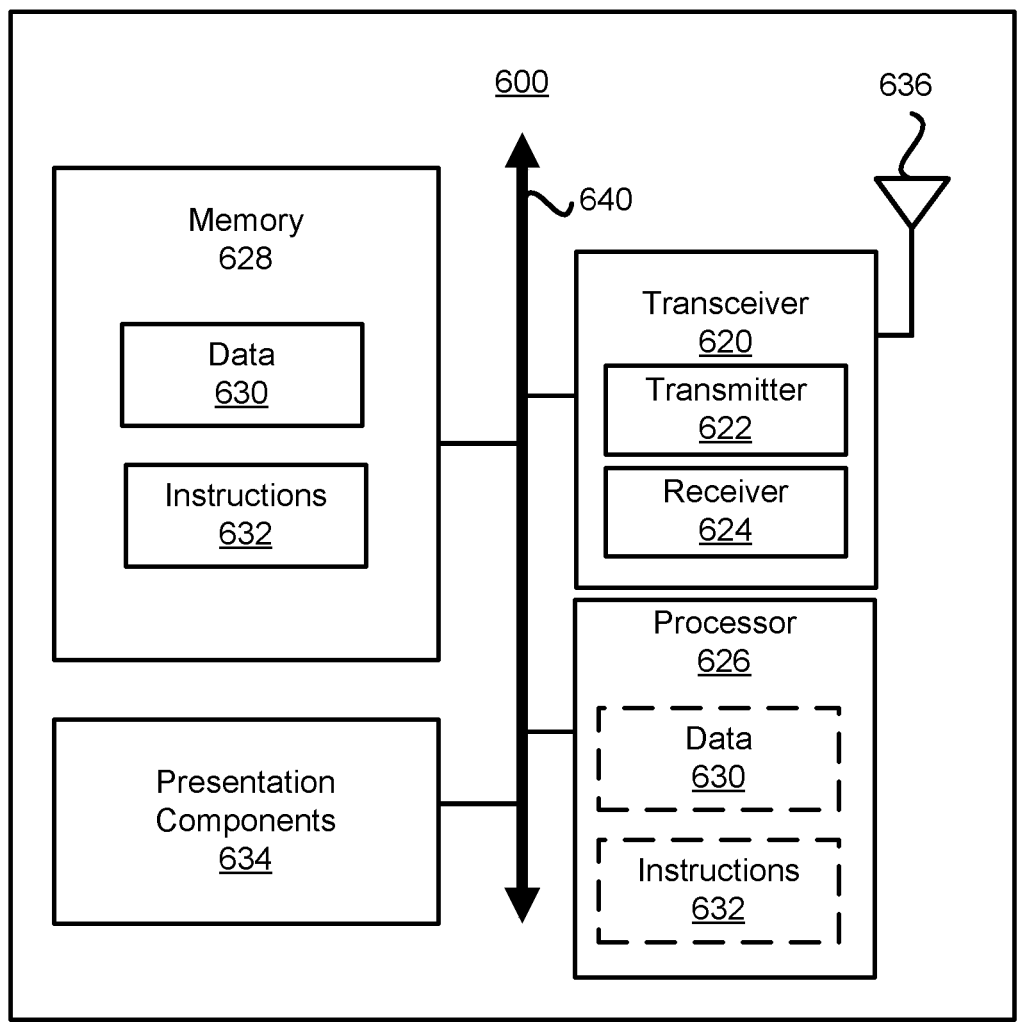
FIG. 6 is a block diagram illustrating a node for wireless communication, according to an implementation of the present disclosure.

FIG. 6 is a block diagram illustrating a node 600 for wireless communication, according to an implementation of the present disclosure.

As illustrated in FIG. 6, the node 600 may include a transceiver 620, a processor 626, a memory 628, one or more presentation components 634, and at least one antenna 636. The node 600 may also include a Radio Frequency (RF) spectrum band module, a BS communications module, a network communications module, a system communications management module, input/output (I/O) ports, I/O components, and a power supply (not illustrated in FIG. 6).

Each of these components may be in communication with each other, directly or indirectly, over one or more buses 640. The node 600 may be a UE or a BS that performs various disclosed functions illustrated in FIG. 5 and examples in this disclosure.

The transceiver 620 may include a transmitter 622 (with transmitting circuitry) and a receiver 624 (with receiving circuitry) and may be configured to transmit and/or receive time and/or frequency resource partitioning information. The transceiver 620 may be configured to transmit in different types of subframes and slots including, but not limited to, usable, non-usable, and flexibly usable subframes and slot formats. The transceiver 620 may be configured to receive data and control channels.

The node 600 may include a variety of computer-readable media. Computer-readable media may be any media that can be accessed by the node 600 and include both volatile (and non-volatile) media and removable (and non-removable) media. Computer-readable media may include computer storage media and communication media. Computer storage media may include both volatile (and/or non-volatile), as well as removable (and/or non-removable), media implemented according to any method or technology for storage of information, such as computer-readable media.

Computer storage media may include RAM, ROM, EPROM, EEPROM, flash memory (or other memory technology), CD-ROM, Digital Versatile Disk (DVD) (or other optical disk storage), magnetic cassettes, magnetic tape, magnetic disk storage (or other magnetic storage devices), etc. Computer storage media do not include a propagated data signal.

Communication media may typically embody computer-readable instructions, data structures, program modules, or other data in a modulated data signal, such as a carrier wave, or other transport mechanisms and include any information delivery media. The term "modulated data signal" may mean a signal that has one or more of its characteristics set or changed in such a manner as to encode information in the signal. Communication media may include wired media, such as a wired network or direct-wired connection, and wireless media, such as acoustic, RF, infrared, and other wireless media. Combinations of any of the disclosed media should be included within the scope of computer-readable media.

The memory 628 may include computer-storage media in the form of volatile and/or non-volatile memory. The memory 628 may be removable, non-removable, or a combination thereof. For example, the memory 628 may include solid-state memory, hard drives, optical-disc drives, etc. As illustrated in FIG. 6, the memory 628 may store computer-readable and/or computer-executable instructions 632 (e.g., software codes) that are configured to, when executed, cause the processor 626 (e.g., processing circuitry) to perform various disclosed functions. Alternatively, the instructions 632 may not be directly executable by the processor 626 but may be configured to cause the node 600 (e.g., when compiled and executed) to perform various disclosed functions.

The processor 626 may include an intelligent hardware device, a central processing unit (CPU), a microcontroller, an ASIC, etc. The processor 626 may include memory. The processor 626 may process the data 630 and the instructions 632 received from the memory 628, and information received through the transceiver 620, the baseband communications module, and/or the network communications module. The processor 626 may also process information to be sent to the transceiver 620 for transmission via the antenna 636, and/or to the network communications module for transmission to a CN.

One or more presentation components 634 may present data to a person or other devices. Presentation components 634 may include a display device, a speaker, a printing component, a vibrating component, etc.

From the present disclosure, it is evident that various techniques can be utilized for implementing the disclosed concepts without departing from the scope of those concepts. Moreover, while the concepts have been disclosed with specific reference to specific implementations, a person of ordinary skill in the art would recognize that changes can be made in form and detail without departing from the scope of those concepts. As such, the present disclosure is to be considered in all respects as illustrative and not restrictive. It should also be understood that the present disclosure is not limited to the specific disclosed implementations, but that many rearrangements, modifications, and substitutions are possible without departing from the scope of the present disclosure.

What is claimed is:

1. A method performed by a user equipment (UE) for updating a location of the UE that is in a radio resource control (RRC) inactive state, the method comprising:
determining whether a small data transmission (SDT) procedure is ongoing in a case that an event for triggering a location update procedure occurs; and
initiating the location update procedure in a case that the SDT procedure is not ongoing.

2. The method of claim 1, further comprising:
refraining from initiating the location update procedure in a case that the SDT procedure is ongoing.

3. The method of claim 1, wherein:
the location update procedure comprises a radio access network (RAN) notification area update (RNAU) procedure, and
the event indicates that (i) an RNAU timer has expired, or (ii) the UE has moved out of a stored RAN notification area (RNA).

4. The method of claim 3, further comprising:
starting the RNAU timer upon reception of a first value configured for the RNAU timer in a first radio resource control (RRC) release message that instructs the UE to transition to the RRC inactive state; and
keeping the RNAU timer running during the ongoing SDT procedure.

5. The method of claim 4, further comprising:
receiving a second RRC release message as a response of the ongoing SDT procedure;
re-starting the RNAU timer with a second value configured for the RNAU timer in a case that the second RRC release message includes the second value; and
stopping the RNAU timer in a case that the second RRC release message does not include the second value.

6. The method of claim 3, further comprising:
setting a parameter, that indicates whether the RNAU procedure is pending, to 'true' in a case that both of the following conditions are fulfilled:
the RNAU timer has expired; and
the UE receives an RRC reject message as a response of the ongoing SDT procedure.

7. The method of claim 3, further comprising:
setting a parameter, that indicates whether the RNAU procedure is pending, to 'false' in a case that the UE initiates the SDT procedure.

8. The method of claim 1, wherein:
the SDT procedure comprises one of an RRC-based SDT procedure or an RRC-less SDT procedure, the RRC-based SDT procedure comprising transmitting a first packet that is embedded in an RRC resume request message, and the RRC-less SDT procedure comprising transmitting a second packet that is not embedded in the RRC resume request message.

9. The method of claim 1, wherein:
the location update procedure comprises a tracking area update (TAU) procedure in a case that the UE is configured to transition to the RRC Inactive state or an RRC Idle state.

10. The method of claim 1, wherein:
the SDT procedure comprises one of a random access (RA) SDT procedure or a configured grant (CG) SDT procedure, and
the SDT procedure is implemented on Evolved Universal Terrestrial Radio Access (E-UTRA) protocols or New Radio (NR) protocols.

11. A user equipment (UE) for updating a location of the UE that is in a radio resource control (RRC) inactive state, comprising:
one or more processors; and
at least one non-transitory machine-readable medium coupled to at least one of the one or more processors and storing computer-executable instructions that, when executed by the at least one of the one or more processors, cause the UE to:
determine whether a small data transmission (SDT) procedure is ongoing in a case that an event for triggering a location update procedure occurs; and
initiate the location update procedure in a case that the SDT procedure is not ongoing.

12. The UE of claim 11, wherein the computer-executable instructions, when executed by the at least one of the one or more processors, further cause the UE to:
refrain from initiating the location update procedure in a case that the SDT procedure is ongoing.

13. The UE of claim 11, wherein:
the location update procedure comprises a radio access network (RAN) notification area update (RNAU) procedure, and
the event indicates that (i) an RNAU timer has expired, or (ii) the UE has moved out of a stored RAN notification area (RNA).

14. The UE of claim 13, wherein the computer-executable instructions, when executed by the at least one of the one or more processors, further cause the UE to:
start the RNAU timer upon reception of a first value configured for the RNAU timer in a first radio resource control (RRC) release message that instructs the UE to transition to the RRC inactive state; and
keep the RNAU timer running during the ongoing SDT procedure.

15. The UE of claim 14, wherein the computer-executable instructions, when executed by the at least one of the one or more processors, further cause the UE to:
receive a second RRC release message as a response of the ongoing SDT procedure;
re-start the RNAU timer with a second value configured for the RNAU timer in a case that the second RRC release message includes the second value; and
stop the RNAU timer in a case that the second RRC release message does not include the second value.

16. The UE of claim 13, wherein the computer-executable instructions, when executed by the at least one of the one or more processors, further cause the UE to:
set a parameter, that indicates whether the RNAU procedure is pending, to 'true' in a case that both of the following conditions are fulfilled:
the RNAU timer has expired; and
the UE receives an RRC reject message as a response of the ongoing SDT procedure.

17. The UE of claim 13, wherein the computer-executable instructions, when executed by the at least one of the one or more processors, further cause the UE to:
set a parameter, that indicates whether the RNAU procedure is pending, to 'false' in a case that the UE initiates the SDT procedure.

18. The UE of claim 11, wherein:
the SDT procedure comprises one of an RRC-based SDT procedure or an RRC-less SDT procedure, the RRC-based SDT procedure comprising transmitting a first packet that is embedded in an RRC resume request message, and the RRC-less SDT procedure comprising transmitting a second packet that is not embedded in the RRC resume request message.

19. The UE of claim 11, wherein:

the location update procedure comprises a tracking area update (TAU) procedure in a case that the UE is configured to transition to the RRC Inactive state or an RRC Idle state.

20. The UE of claim 11, wherein:

the SDT procedure comprises one of a random access (RA) SDT procedure or a configured grant (CG) SDT procedure, and the SDT procedure is implemented on Evolved Universal Terrestrial Radio Access (E-UTRA) protocols or New Radio (NR) protocols.

\* \* \* \* \*